United States Patent
Franey et al.

(10) Patent No.: US 11,763,216 B2
(45) Date of Patent: Sep. 19, 2023

(54) SYSTEMS AND METHODS FOR DETERMINING DYNAMIC SUBSTITUTIONS TO MINIMIZE DISTANCE

(71) Applicant: 6 RIVER SYSTEMS, LLC, Waltham, MA (US)

(72) Inventors: Catherine Jones Franey, Waltham, MA (US); Nikita Ivanov, Malden, MA (US); Timothy Deignan, Watertown, MA (US); Jeffrey Choate, Hollis, NH (US)

(73) Assignee: 6 RIVER SYSTEMS, LLC, Waltham, MA (US)

( * ) Notice: Subject to any disclaimer, the term of this patent is extended or adjusted under 35 U.S.C. 154(b) by 175 days.

(21) Appl. No.: 17/157,738

(22) Filed: Jan. 25, 2021

(65) Prior Publication Data
US 2022/0237530 A1 Jul. 28, 2022

(51) Int. Cl.
*G06Q 10/047* (2023.01)
*G06Q 10/0875* (2023.01)

(52) U.S. Cl.
CPC ....... *G06Q 10/047* (2013.01); *G06Q 10/0875* (2013.01)

(58) Field of Classification Search
None
See application file for complete search history.

(56) References Cited

U.S. PATENT DOCUMENTS

| | | | | |
|---|---|---|---|---|
| 7,233,914 | B1 * | 6/2007 | Wijaya | G06Q 10/087 705/28 |
| 2010/0082447 | A1 * | 4/2010 | Lin | G06Q 30/0601 705/26.1 |
| 2017/0059336 | A1 * | 3/2017 | Huang | G01C 21/34 |
| 2020/0380578 | A1 * | 12/2020 | Xu | G06Q 30/0629 |
| 2022/0051310 | A1 * | 2/2022 | Graube | H04W 4/33 |
| 2022/0215336 | A1 * | 7/2022 | Hurst | G05D 1/0287 |
| 2022/0234872 | A1 * | 7/2022 | Sharma | B66F 9/063 |

* cited by examiner

*Primary Examiner* — Scott A Zare
(74) *Attorney, Agent, or Firm* — FOLEY & LARDNER LLP

(57) ABSTRACT

Disclosed are systems and methods for identifying an available product for an unavailable product to minimize a deviation or distance from an original planned pick path. A computer can transmit instructions corresponding to a path through a location where products are stored to collect a plurality of products stored at locations along the path. In response to receiving a notification for a particular product that the particular product is not at the location where it is stored, the computer can modify the path to include a location of a substitute product for the particular product. The computer can identify a substitute product for the particular product based on a distance from a location of the one more available products to a location along the path and determine a revised path with the substitute product. The path can be revised to include the location for the available product.

14 Claims, 8 Drawing Sheets

SYSTEMS AND METHODS FOR DETERMINING DYNAMIC SUBSTITUTIONS TO MINIMIZE DISTANCE

TECHNICAL FIELD

This application relates to pick paths in warehouses and other places where products are stored and, more particularly to dynamically revising a transmitted path to obtain a substitute product.

BACKGROUND

Customers place orders online to be picked up at a store or warehouse. Products (or items) included in the order are picked in-store or in the warehouse by someone other than the customer (e.g., a picker, robot, or a hybrid system). However, in the time between a customer placing the order and the products in the order being retrieved, inventory in the store or warehouse can change, and one or more products included in the order may be out of stock when the picker attempts to add the product(s) to the order.

The store or picker can attempt to select substitute or alternative products for the customer in place of the out-of-stock originally-requested product. The substitute products can include a higher or lower cost product, a product of a different brand, a different size/volume of product, or a combination of products. Once the picker realizes that the product is missing, the picker can choose a substitute product. In some cases, the substitute products may be unavailable, so the picker is forced to check multiple locations within a store or warehouse to find an appropriate substitution or confirm the substitutes are also unavailable. The selection of substitutes can cause delays and inefficiencies in completing an order, for example, based in part on the increased distance the picker needs to transverse to check the locations of the substitute products, the picker's unfamiliarity with the locations of the substitute products, or the picker trying to decide what may be an appropriate substitute product. The delays not only affect the customer, but also prevent the picker from fulfilling another order.

BRIEF DESCRIPTION OF THE DRAWINGS

The accompanying drawings constitute a part of this specification and illustrate embodiments of the subject matter disclosed herein.

DETAILED DESCRIPTION

Figure 1A:
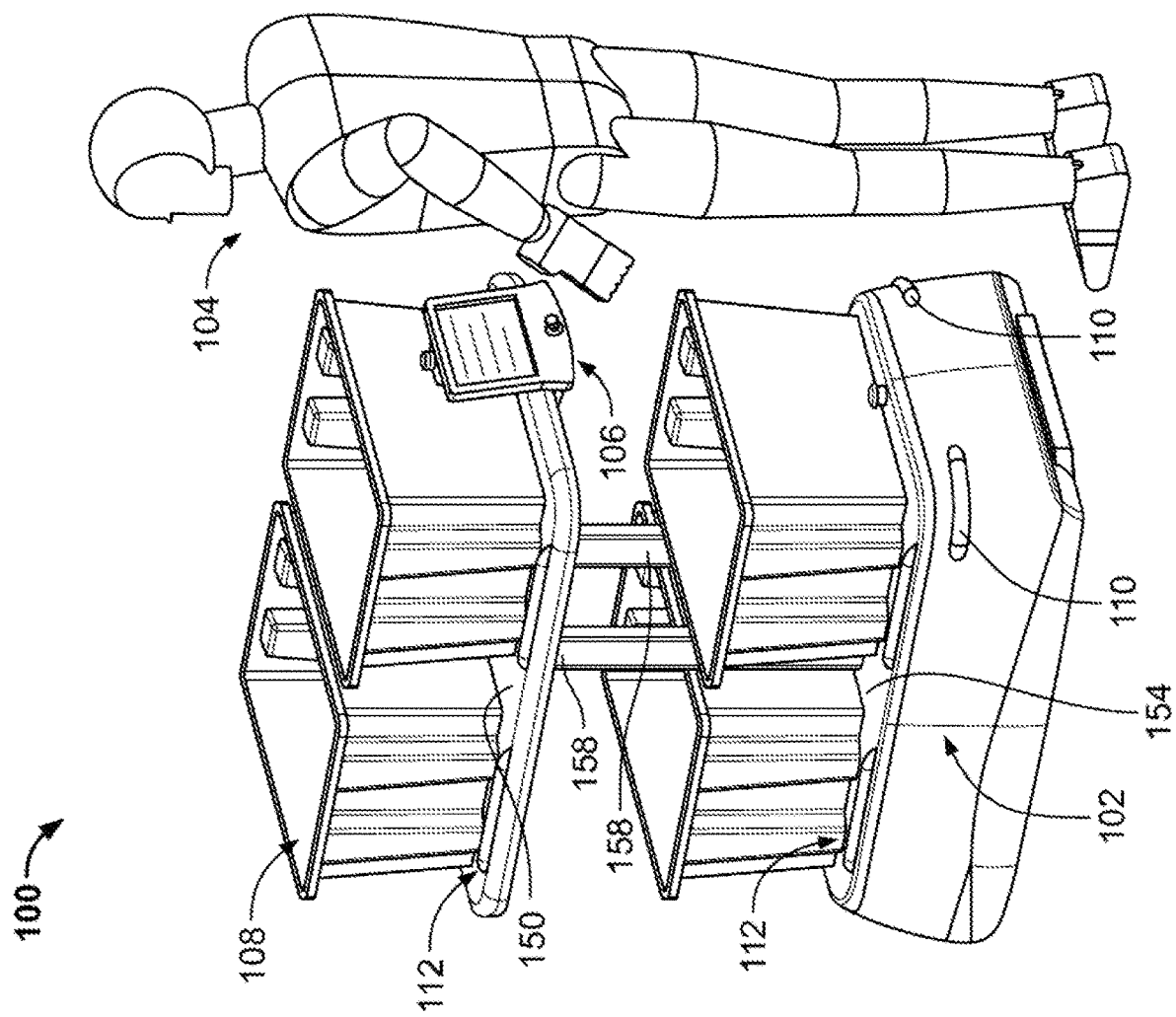
FIG. 1A is a model of an embodiment of an autonomous vehicle configured to collect items for orders, in accordance with an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The techniques, systems, and methods described herein are directed to identifying an available product for an unavailable product to minimize a deviation or distance from an original planned pick path. A system can generate a pick path indicating a plurality of locations (e.g., within a store or warehouse) for a device (e.g., enhanced cart, robotic device) to find and select one or more products included in a listing (e.g., pick list, customer's list, grocery list, shopping list). The path can include a plurality of tasks or units of work, and each task can identify at least one product and a location for the respective product. The products can be located, for example, at a warehouse, fulfillment centre, retail location, or other forms of facilities or shopping centers. The system can transmit instructions for the path such that tasks are executed in sequential order by the device. In some embodiments, the system can transmit instructions for the path such that tasks are displayed in sequential order through an interface of the device for a user (e.g., picker) using the device to collect one or more products. In some embodiments, the system can display one individual task at a time as the device and/or user progresses through the path such that upon completion of a first task (e.g., first product at a first location), a second task (e.g., second product at a second location) is displayed through the interface.

The system can receive a notification from a device, a picker, inventory management system, or otherwise, indicating an interruption (e.g., exception, unable to satisfy a task due to missing product) associated with at least one product included in the listing. For example, the device can determine that a product included in the listing is not at the indicated location and can provide the notification to the system indicating a status of the product. The notification can indicate that the product is missing, unavailable at the indicated location, a damaged item (e.g., item on shelf is damaged and not available to fulfill an order) and/or that no inventory exists for the desired product at one or more alternate locations. The system can perform a query or lookup to identify one or more available products as a substitute for the missing product. The substitute product can include a product in the same product class, a requested product but in a different storage location, a product having different properties, a different type of product from an unavailable product, a replacement product (e.g., different brand), an available product having the same or similar functionality, characteristics, and/or ingredients to the unavailable product. The system can choose from options for available products based in part on a distance from a current location of the device, the original product location, or a location of each available product to one or more product locations indicated in the path. While a device is along the path collecting the products, the system can dynamically revise the path to incorporate the selected, available product based on the distance of the selected, available product from the original path. The system can transmit instructions for the revised path to include the location for the available product. In some embodiments, the system can dynamically update (e.g., as the device is actively executing the instructions for the path) the path to include the location for the available product. The revised path may include the available product as the next task in the path or as a future task in the path.

The available substitute product can be determined based in part on a distance from one or more pick locations of products not yet retrieved and identified in the path. In some embodiments, the system calculates a distance between the location of each of the one or more available products and each of the upcoming pick locations on the path. The system can compare the distance values of each available product to points along the originally planned path. For example, the system can select the available product that is located the minimum distance from at least one upcoming pick location or a location during a transition to pick another item (e.g., between two upcoming pick locations of the originally planned path). In some embodiments, the system can insert the location of the available product in the revised path before or after the upcoming pick location that is positioned the minimum distance from the location of the available product to reduce the deviation from the originally planned path or minimize a change in a total distance of the path. The system can generate instructions to update the path to include a new task (e.g., unit of work, pick task) for the available product prior to or after the task corresponding to the minimum point or minimum distance. In some embodiments, the system can insert the location of the available product in the revised path at the same position (e.g., same pick order) along the path as the original or missing product. The system can change the order so as to move the original location of the missing product to be before or after other products in the planned path based on location of the selected available product. The available products can include products that have different properties or are a different type of product from the missing product. In some embodiments, the available products can include products having the same or similar functionality, characteristics, and/or ingredients to the unavailable product. In some embodiments, the system can access metadata for the one or more available products to determine if the available products are a proper substitute for the unavailable product.

The server or system can perform a query or lookup to retrieve a set of possible available product options for the missing desired product based in part on an acceptance probability score assigned or attached to each of the possible available product options. The system can select the available product based in part on an acceptance probability indicating a likelihood that a user will accept or agree to the available product. The system can execute an acceptance probability algorithm using input data associated with multiple possible available products for the missing product to generate acceptance scores for the possible available products for the missing product. In some embodiments, the acceptance probability algorithm considers products in a same product class (e.g., consider all peanut butter products as a substitute for peanut butter, or consider all juice products as a substitute for orange juice). In some embodiments, the acceptance probability algorithm can include data associated with previous substitutions accepted by the user, previous substitutions accepted by one or more other users (e.g., similar users, group profile), and/or product ranking data. The system can select the available product having the highest acceptance probability score.

The system can use a combination of a distance and an acceptance probability score to select the available product as a substitute for the missing product. The system or server can select the available product having the lowest minimum distance from the current position of the device and/or product in a list along the planned path, a buyer acceptance probability score above a threshold, or a combination of the buyer acceptance probability score being above the threshold and the distance for each possible available, substitute product. For example, in some embodiments, the system can select the available product having the minimum distance and the highest acceptance probability score or select the available product having the greatest weighted score that is generated using the distance and the acceptance probability score for the respective available product. In other embodiments, the system may select an available product from available options based only on the minimum distance. In an alternative embodiment, the system can generate a request to the customer to select an available product as a substitute for the unavailable product. Responsive to receiving the customer's selection, the system can then update the path to include the new location that has the selected available product.

The system can include or be communicatively coupled to a device, including but not limited to, an enhanced cart, a client device, handheld computing device, mobile phone, work device or robotic device (e.g., autonomous robotic device). In some embodiments, the system can include a server that provides a client application executing at a device and communicatively coupled to the product system to receive path information, receive updates to path information and/or provide user feedback to the product system from the device. The system can connect to a variety of different servers or databases to receive or provide inventory data and dynamically update a planned pick path.

The system can include an inventory management database to dynamically update product information including availability and amount remaining. The inventory data can include, but is not limited to, current product amounts, product locations, check-out counter data, or employee device updates (e.g., re-stocks, removals, exceptions raised by other employees). The system can dynamically update the inventory management database to reflect one or more products being taken (e.g., inventory depleted) and one or more products being restocked and dynamically update a planned pick path for a device using data from the inventory management database. In some embodiments, the system can connect to a third party server to receive inventory data associated with one or more products. The system can dynamically receive updates from the third party server responsive to one or more products being taken or sold (e.g., inventory depleted) and one or more products being restocked to dynamically update a planned pick path for a user. The inventory data can include data from different stores or different retails shops located in a common environment (e.g., mall setting, warehouse for multiple companies). The system can identify or select available products from other brands, different companies, or different retail locations from the brand, company, or retail location of the missing product to provide more options or to identify an available product having a higher acceptance probability score. The system can track individual products or items to identify potential issues (e.g., missing products after path originally generated) with an active pick path and/or to dynamically update an active pick path so that the device is not interrupted or stopped in performing the pick path.

In some embodiments, the system communicates with the client application to receive feedback from the device or a user (e.g., customer, buyer, store employee) working with the device to execute a pick path. For example, the client application can include an application executing on the device as the device and the user move around a store environment. In another example, the client application can include an application communicatively coupled to the device (e.g., picker device, robotic device) making selections for the buyer at the store environment while the buyer is positioned at a different location (e.g., home). The buyer can provide feedback through the application and the system can update the pick path based in part on the feedback. The feedback can indicate that a product was taken, a product is missing, a product amount is low, or include requests from a listing or ranking of multiple available products and/or a selection of an available product from a listing or ranking of multiple available products. The system can connect or attempt to connect, for example, to a server (e.g., inventory management database, warehouse server, third party server) responsive to receiving feedback from the user to update a product status, receive an available product for a missing product and/or an updated path including an available product as a substitute.

In some embodiments, as a device executes the instructions for a path to traverse the planned pick path, the system can connect to a server, for example, through a WiFi connection or other forms of network connections. Once the connection is established, the server or system can receive the feedback from the device, a current pick location, or current location of the device within the environment, as well as any additional information from prior picks that has not yet been uploaded to the server. For example, the current pick location can be different from the location of the missing product or the location from which the feedback was submitted. The server or system can determine the new location of the device to determine an appropriate available product based in part on a current status (e.g., location) in the planned pick path (e.g., what upcoming product locations are remaining in the path).

As the device continues along the planned pick path, the system or server can dynamically update the path to include one or more available products and a location for each of the one or more available products to eliminate or reduce any interruption to the execution of the planned pick path. In some instances, that device and/or a user of the device may be unaware the active path is being updated as the system can continuously monitor and update the planned pick path based on the progress of the device and during execution of the planned pick path.

Referring now to FIG. 1A, an enhanced cart system 100 including an enhanced cart 102 (e.g., an autonomous vehicle) is provided. As illustrated, one or more enhanced carts, often referred to in the industry as picking carts, can work alongside one or more warehouse workers 104 (also referred to as associates or pickers) to move inventory items around a warehouse. The enhanced carts 102 are intended to assist in most warehouse tasks, such as picking, re-stocking, moving, sorting, counting, or verifying items (e.g., products). These carts 102 can display information to the associate 104 through the use of a user interface (e.g., screen) 106 and/or onboard visual and/or audible indicators that improve the performance of the associates 104. The cart 102 can be propelled by a motor (e.g., an electric motor) that is coupled to a power source (e.g., a battery, a supercapacitor, etc.), such that the cart 102 moves autonomously and does not require being pushed or pulled by a human or other force. The cart 102 may travel to a charging area to charge its battery or batteries.

Referring still to FIG. 1A, the enhanced carts 102 may be configured to carry one or many similar or distinct storage containers 108, often in the form of totes or boxes, that can be used to hold one or more different products. These storage containers 108 may be removable from the enhanced cart 102. In some cases, each container 108 can be used as a separate picking location (i.e., one container 108 is a single order). In other cases, the containers 108 can be used for batch picking (i.e., each container 108 can contain multiple complete or partial orders). Each container 108 may be assigned to one or many different stations for post-pick sortation and processing. In one embodiment, one or more of the containers 108 are dedicated to batch picking of multiple types of products and another one or more containers 108 are dedicated to picking multiple quantities of a single product (eaches), such as for orders that only have one item. This singleton picking allows the warehouse to skip secondary sortation and deliver products directly to a packaging station. In another embodiment, one or more of the containers 108 are assigned to order picking (e.g., for potentially time sensitive orders) and one or more of the containers 108 are assigned to batch picking (e.g., for lower cost or less time sensitive orders). In yet another embodiment, one or more of the containers 108 carry product that will be used to re-stock product into storage locations. Another option is for the enhanced cart 102 to move product and/or shipments throughout the warehouse as needed between different stations, such as packing and shipping stations. In yet another implementation, one or more of the containers 108 is left empty to assist in counting product into and then back out of the container 108 as part of a cycle count task regularly carried out in warehouses for inventory management. The tasks may be completed in a mode dedicated to one task type or interleaved across different task types. For example, an associate 104 may be picking products into container "one" on the enhanced cart 102 and then be told to grab products from container "two" on the enhanced cart 102 and put them away in the same aisle.

Figure 1B:
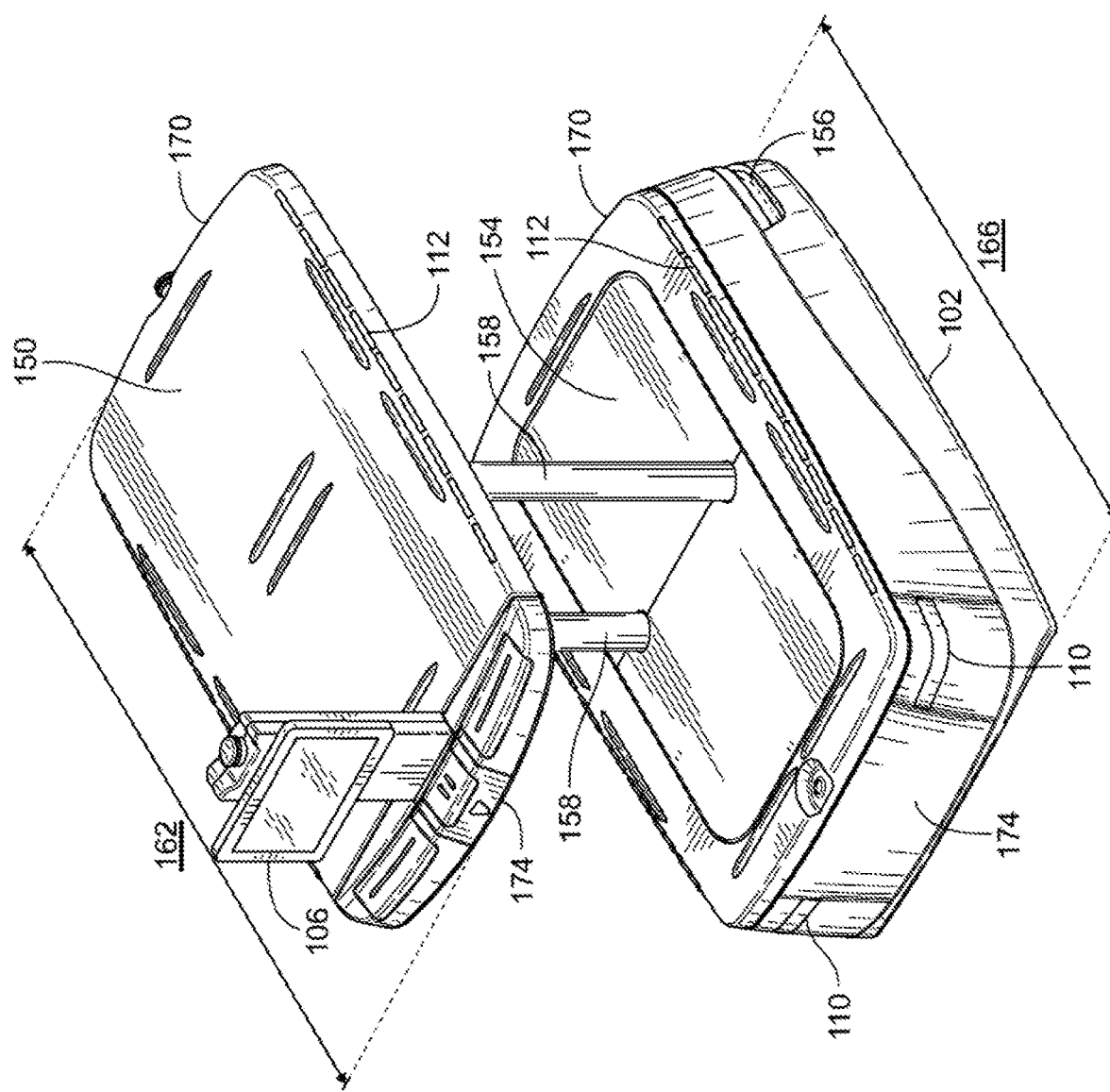
FIG. 1B is a model of another embodiment of an autonomous vehicle configured to collect items for orders, in accordance with an embodiment.

Now referring to FIG. 1B, an alternative embodiment of the enhanced cart 102, and is shown (for ease of understanding) without the storage containers 108 being present is provided. As before, the enhanced cart 102 includes the screen 106 and lighting indicators 110, 112. In operation, the storage containers 108 may be present on the enhanced cart 102 depicted in FIG. 1B. With reference to both FIGS. 1A and 1B, the enhanced cart 102 may include first and second platforms 150, 154 for supporting a plurality of containers 108 capable of receiving products. At least one support 158 may support the first platform 150 above the second platform 154. The at least one support 158 may be substantially centrally-located along respective lengths 162, 166 of the first and second platforms 150, 154 between front and back ends 170, 174 thereof and may support the first and second platforms 150, 154 at locations disposed within interior portions of the first and second platforms 150, 154. As illustrated in FIG. 1B, the front end 170 of the cart 102 may define a cutout 156. There may be one or more sensors (e.g., light detecting and ranging sensors) housed within the cutout 156. The cutout 156 permits the sensor(s) to view and detect objects in front of and to the side of (e.g., more than 180° around) the cart 102.

The following discussion focuses on the use of autonomous vehicles, such as the enhanced cart 102, in a warehouse environment, for example, to assist with various warehouse-related tasks, including picking, re-stocking, carrying, moving, sorting, counting, or verifying inventory (e.g., products) or customer orders for shipping. However, autonomous vehicles of any type can be used in many different settings and for various purposes, including but not limited to: driving passengers on roadways, delivering food and medicine in hospitals, carrying cargo in ports, cleaning up waste, etc. This disclosure, including but not limited to the technology, systems, and methods described herein, is equally applicable to any such type of autonomous vehicle.

Figure 1C:
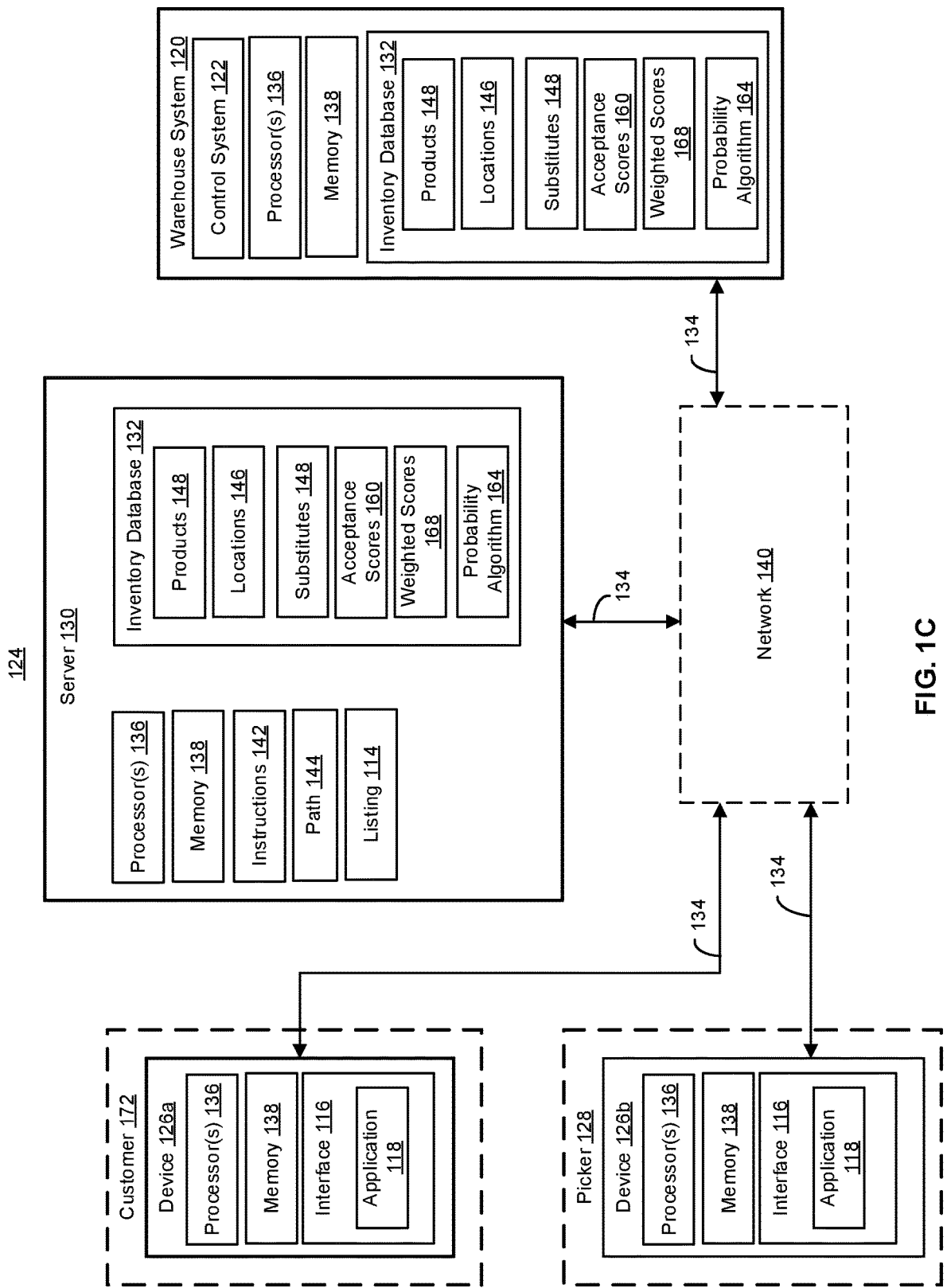
FIG. 1C is a block diagram of embodiments of a system for determining dynamic substitutions to minimize a distance, in accordance with an embodiment.

Referring to now to FIG. 1C, a system 124 for identifying an available product for an unavailable product to minimize a deviation or distance from an original planned pick path is provided. The system 124 can include a server 130, one or more enhanced carts 126 (referred to herein as devices 126) communicatively coupled to a warehouse system 120 and/or communicatively coupled to the commerce center and/or the server 130. The warehouse system 120 as used herein may refer to a system, server, or communications system for a commerce center, store, retail location, fulfillment centre warehouse (e.g., warehouse 204 of FIG. 2), a place or establishment where products are stored or other forms of facilities or shopping centers. A control system 122 of the warehouse system 120 or server 130 can provide instructions 142 through to a device 126a to select or retrieve one or more products (e.g., represented by product data 148) from locations (e.g., represented by location data 146) within a warehouse and complete an order or request from a customer (e.g., online order, pick list, customer's list, grocery list, shopping list). The instructions 142 can indicate a pick path 144 through the warehouse and the locations within the warehouse for the picker 128 to find and collect the requested products. The device 126 can receive the instructions 142 and execute the instructions 142 path 144 indicating the location data 146 and product data 148 for the one or more products to collect the products from their indications locations. In some embodiments, the device 126 can receive the instructions 142 and display the pick path 144 to a picker 128 or customer 172 operating the device 126 or following the device 126 through the warehouse to collect the products. In some embodiments, while the device 126 is executing the instructions 142 and traversing along the path 144 collecting the products, the control system 122 and/or server 130 can dynamically revise the path 144, for example, in response to a product being unavailable and to incorporate a selected available substitute product for the unavailable product. The substitute product can be selected based in part on a distance of the selected, available product from the original path 144. The control system 122 and/or server 130 can transmit instructions 142 for the revised path 144 to the device 126 to include the location data 146 and product data 148 for the available substitute product.

The device 126, control system 122, and server 130 can be implemented using hardware or a combination of software and hardware. For example, components of the device 126, control system 122, and server 130 can include logic circuitry (e.g., processor 136, a central processing unit or CPU) that responds to and processes instructions fetched from a memory unit (e.g., memory 138). Components of the device 126, control system 122, and server 130 can include or use a microprocessor or a multi-core processor. A multi-core processor can include two or more processing units (e.g., processor 136) on a single computing component. Components of the device 126, control system 122, and server 130 can be based on any of these processors, or any other processor capable of operating as described herein.

The device 126, control system 122, and server 130 can include at least one logic device such as a computing device or server having at least one processor 136 to communicate. The components and elements of the device 126, control system 122, and server 130 can be separate components or a single component. The device 126, control system 122 and server 130 can include a memory component (e.g., memory 138, database 132) to store and retrieve data (e.g., instructions 142, path 144, tasks). The memory 138 can include a random access memory (RAM) or other dynamic storage device for storing information, and instructions to be executed by the device 126, control system 122 and server 130. The memory 138 can include at least one read only memory (ROM) or other static storage device for storing static information and instructions for the device 126, control system 122, and server 130. The memory 138 can include a storage device, such as a solid state device, magnetic disk or optical disk, to persistently store information and instructions. The memory 138 can be the same as or substantially similar to storage 518 of FIG. 5.

The device 126, control system 122, and server 130 can include a processor 136. The processor 136 can include non-volatile memory that stores computer instructions and an operating system. For example, the computer instructions can be executed by the processor 136 out of volatile memory to perform all or part of the method 400. In some embodiments, the device 126, control system 122, and server 130 can include a non-transitory computer-readable medium, comprising instructions that, when executed by the processor 136 of the device 126, control system 122, and server 130, cause the processor 136 to perform all or part of the method 400. The processor 136 can be the same as or similar to processing units 516 of FIG. 5.

The device 126, control system 122, and server 130 can include an inventory database 132 to store and maintain inventory data dynamically update product information including availability and amount remaining. In some embodiments, one or more of the device 126, control system 122, and server 130 may include and maintain the inventory database 132 and the device 126, control system 122, or server 130 may communicate with the component maintaining the inventory database 132. For example, in one embodiment, the control system 122 or the server 130 (e.g., one inventory database 132) may include and maintain the inventory database 132 and the device 126 may communicate with at least one of the control system 122 or server 130 to access data in the inventory database 132. The inventory data can include product data 148, product location data 146, substitute product data 148, acceptance scores 160, weighted scores 168 and an acceptance probability algorithm 164. In some embodiments, the acceptance scores 160, weighted scores 168 and/or acceptance probability algorithm 164 can be maintained in the inventory database 132. In other embodiments, one or more of the acceptance scores 160, weighted scores 168 and/or acceptance probability algorithm 164 can be maintained in a different system, different database, individual databases, or different data store from the inventor database 132 and the sever 130 can access one or more acceptance scores 160, weighted scores 168 and acceptance probability algorithm 164, for example, to identify substitute products 148. In one embodiment, the acceptance scores 160, weighted scores 168 and an acceptance probability algorithm 164 can each be maintained in separate or individual databases, data stores or memory locations. The inventory data can include, but is not limited to, current product amounts, product locations, check-out counter data, or employee device updates (e.g., re-stocks, removals, exceptions raised by other employees). The inventory database 132 can indicate or be dynamically updated to reflect one or more products being taken (e.g., inventory depleted) and one or more products being restocked and dynamically update a planned pick path 144 for the device 126 or for a user (e.g., picker 128, customer 172) using data from the inventory database 132. The device 126, control system 122, and server 130 can maintain separate inventory databases 132. In some embodiments, one of the device 126, control system 122, or server 130 can maintain an inventory databases 132 and the device 126, control system 122, or server 130 not having an inventory database 132 can communicate with the component maintaining the inventory database 132 to access, for example, product data. In some embodiments, the inventory databases 132 can be linked or connected, for example, to update an inventory database 132 on the device 126, control system 122, and/or server 130. In some embodiments, the inventory database 132 can connect to a third party server to receive inventory data associated with one or more products. The inventory database 132 can dynamically receive updates from the third party server responsive to one or more products being taken or sold (e.g., inventory depleted) and one or more products being restocked to dynamically update a planned pick path 144 for the device 126. The inventory data can include data from different stores or different retails shops located in a common environment (e.g., mall setting, warehouse for multiple companies). The inventory database 132 can include inventory data for available products from other brands, different companies, or different retail locations from the brand, company, or retail location of the missing product to provide more options or to identify an available product having a higher acceptance probability score. The inventory database 132 can maintain records for and track individual products or items to identify potential issues (e.g., missing products after path originally generated) with an active pick path 144 and/or to dynamically update an active pick path 144 such that the device 126 is not interrupted or stopped in performing the pick path. The inventory database 132 can be the same as or substantially similar to memory 138 of FIG. 1C and/or storage 518 of FIG. 5. The inventory database 132 can be a component of the device 126, control system 122, and server 130. In some embodiments, the inventory database 132 can be remote from the device 126, control system 122, and server 130 and the device 126, control system 122, and server 130 can be connected to the inventory database 132 through network 140 to store and maintain inventory data (e.g., products, stock levels, purchases) from the warehouse system 120.

The device 126 can include or be the same as the enhanced cart 102 described herein with respect to FIGS. 1A and 1B. The device 126 can include a computing device, client device, mobile device, robotic device or handheld computing device operated by, for example, a customer 172 (e.g., user, buyer) or a picker 128 (e.g., employee). The device 126 can include an autonomous robot that guides, directs, or assists a picker 128 through a warehouse to collect one or more products, or the device 126 can be configured to pick products without the assistance of a picker. The device 126 can interact with the server 130 and warehouse system 120 to provide product status information, notifications of missing products and/or completion of tasks associated with a path 144. In some embodiments, the picker 128 can interact with the server 130 and warehouse system 120 through the device 126 (e.g., computer, laptop computer, mobile computing device) to provide product status information, notifications of missing products and/or completion of tasks associated with a path 144. In some embodiments, a customer 172 can interact with the server 130 and warehouse system 120 through the device 126 (e.g., customer device) to provide an order, request a one or more products and/or make purchases from the warehouse system 120. The device 126 can include or be a component of a robotic cart or robotic device used by a picker 128 to retrieve one or more products for an order. The device 126 can include or correspond to an instance of any client device, mobile device or computer device described herein. For example, the device 126 can be the same as or substantially similar to computing system 514 of FIG. 5.

The device 126 can include an application 118 executing on the device 126 to communicate with the server 130 and warehouse system 120 to order one or more products, provide notifications, feedback and/or receive an order status. The application 118 can include a client application or user application (e.g., picker device) to establish or broker a connection 134 between the device 126 and the server 130 and control system 122 of warehouse system 120. In some embodiments, the application 118 can interact with an inventory database 132 to provide offline access to inventory data, product data and substitute product data. The application 118 can include at least one processor 136 that can include non-volatile memory that stores computer instructions and an operating system. The computer instructions can be executed by the processor out of volatile memory to perform all or part of the method 400. In some embodiments, the application 118 can include a non-transitory computer-readable medium, comprising instructions that, when executed by the processor of the application 118, cause the processor to perform all or part of the method 400.

The application 118 can include a cloud computing service, a software as a service (SaaS), infrastructure as a service (IaaS), platform as a service (PaaS), desktop as a Service (DaaS), managed software as a service (MSaaS), mobile backend as a service (MBaaS), and information technology management as a service (ITMaaS). The application 118 can include, but not limited to, desktops, laptops, servers, virtual desktops, virtual applications, SaaS applications, web applications, mobile applications, and other forms of content. The device 126 can include an interface 116. The interface 116 can include a user interface or graphical user interface (GUI) (e.g., a touchscreen, a display, etc.), a barcode scanner (e.g., to scan barcodes on products, items, badges) and one or more input/output (I/O) devices (e.g., a mouse, a keyboard, a microphone, one or more speakers, one or more cameras, one or more biometric scanners, one or more environmental sensors, one or more accelerometers, etc.).

The device 126 can receive instructions 142 to execute a path 144 and collect one or more products based in part on the location data 146 indicated by the instructions 142. In some embodiments, the device 126 can receive instructions 142 to provide a path 144 to a picker 128, user, customer 172 or buyer. The instructions 142 can indicate the path 144 (e.g., route, pick path), location data 146 identifying one or more locations (e.g., pick locations) and/or one or more products. The instructions 142 can include a plurality of tasks or units of work and the individual tasks or units of work can include at least one product, a product identifier, a quantity of the product to be collected, and a location data 146 for the respective product. In some embodiments, the instructions 142 can indicate an order to provide or display the tasks for the path 144 such that the tasks for individual products are provided or displayed one at a time, for example, in sequential order through an interface 116 of the device 126. The device 126 can display, using the instructions 142, one individual task at a time as a picker 128 progresses through the path 144 such that upon completion of a first task (e.g., first product at a first location), a second task (e.g., second product at a second location) is displayed through the interface 116 of the device 126. In some embodiments, the instructions 142 can include an application, code, program, library, script, task, data structure, service, process or any type and form of executable instructions executing on hardware of a device (e.g., device 126).

The path 144 can include a pick path, course or route through a warehouse. The path 144 can correspond to a route to retrieve or select one or more products stored at one or more different locations in the warehouse. The path 144 can include a plurality of data structures corresponding to each location and include coordinates (e.g., global positioning systems (GPS) data), beacon signal data or other forms of signal data to identify a particular location within a warehouse or environment. In some embodiments, the path 144 can include a plurality of pick locations and directions or route between each of the pick locations or from one pick location to a next or subsequent pick location as indicated by the instructions 142. In some embodiments, the path 144 can include commands, code, script, or set of instructions provided to the device 126, for example, to cause or instruct the device 126 to move or locate to a respective pick location 146 indicated by the instructions 142.

The picker 128 as used herein can include or refer to a user, employee, customer, or any form of person (e.g., human worker) or machine (e.g. robotic picker) selecting products 148 from one or more locations. In some embodiments, the picker 128 can include a combination of a human person and machine operating together (e.g., enhanced cart 126, employee pushing robotic cart) to select products 148 from one or more locations. The customer 172 as used herein can include or refer to a buyer, trader, user or individual purchasing one or more products 148 from the warehouse. It should be appreciated that one or more actions or steps performed by the device 126 may be performed by a picker 128 or assisted in being performed by a picker 128 in combination with the device 126. For example, the picker 128 can execute or perform the instructions 142 of a path 144 to collect or retrieve one or more products using the device 126. The picker 128 can traverse the path 144 with the device 126 (e.g., push the device 126, walk with autonomous device 126, carry or wear the device 126) to execute the instructions 142 and collect one or more products. The picker 128 can provide a notification via a client application 118 displayed through an interface 116 of the device 126 to indicate a status (e.g., collected, missing) of a requested product to the device 126 and/or to a server 130 through the device 126. In some embodiments, a control system 122 of the warehouse system 120 or server 130 can provide instructions 142 through to a device 126a for a customer 172 or a device 126b for a picker 128 (collectively referred to herein as device 126) to select one or more products (e.g., represented by product data 148) from locations (e.g., represented by location data 146) within a warehouse and complete an order or request from a customer (e.g., online order, pick list, customer's list, grocery list, shopping list). The instructions 142 can indicate a pick path 144 through the warehouse and the locations within the warehouse for the device 126 and/or picker 128 to find and collect the requested products.

It should be appreciated that although FIG. 1C discusses a warehouse system 120, the warehouse system 120 can correspond to communications system or inventory system for a store, a retail location, a fulfillment centre or other forms of facilities or shopping centers storing, shipping or housing one or more products. A warehouse as used herein can include a product storage facility or shipping depot, for example, for transitioning products or goods from one facility to a next or to a customer location (e.g., house, office). The warehouse system 120 can include a control system 122. The control system 122 can include a server 130 and/or administrator for the warehouse system 120 to communicate with one or more devices 126 and one or more servers 130. The control system 122 can generate instructions 142 indicating a path 144 through the warehouse to collect one or more products.

The control system 122 can maintain an inventory database 132 for the warehouse system 120. The inventory database 132 can include product information and product location data 146 for products held, sold, maintained, stored or otherwise transferred through the warehouse. The location data 146 can indicate or identify a product location within the warehouse or any area or portion of the warehouse that a product is stored, displayed or maintained. The location data 146 can indicate, identify or include, but is not limited to, a shelf location, rack location, bin, area of a warehouse, storage area, physical space or area within the warehouse that an item of stock (e.g., product) is stored, displayed or maintained. The product data 148 as used herein can include or refer to data or identifiers for products and/or services, including physical products, digital content, tickets, subscriptions, services to be provided, and the like. Listing 114 can include a shopping list, grocery list, customer order, or any form of a listing including product data 148 and location data 146 indicating one or more products to be selected or retrieved from one or more locations.

The server 130 can include a commerce platform (e.g., e-commerce platform) for determining dynamic substitutions for unavailable products to minimize walking distance of a picker 128 collecting one or more products. The server 130 can include a server 130 of a warehouse system 120 or a server 130 communicatively coupled to the warehouse system 120 through network 140. The server 130 can include a processor 136 and memory 138. In some embodiments, the processor 136 can control operation of the server 130, for example, to perform all or part of the method 400. The memory 138 can store and maintain inventory information, product information, product location information, path data, picker information, customer data and/or customer profiles. The memory 138 can include or be linked with an inventory database 132.

The server 130 can generate acceptance probability scores 160 for products stored, maintained or held at the warehouse. The acceptance probability score 160 can indicate a likelihood that a user or customer will accept or agree to the available substitute product. The acceptance probability score 160 for a product can be based on a group of customers or a single customer. For example, the server 130 can maintain acceptance probability scores 160 for one or more products for a single customer in a customer profile in the inventory database 132. In some embodiments, the server 130 can maintain acceptance probability scores 160 for one or more products using customer data from a group of different customers in the inventory database 132. The server 130 can execute an acceptance probability algorithm 164 to generate acceptance probability scores 160. The acceptance probability algorithm 164 can include one or more machine learning algorithms and/or artificial intelligence (AI) techniques to generate acceptance probability scores 160. In some embodiments, the inputs to the acceptance probability algorithm 164 can include, but are not limited to, product, product classes, data associated with previous substitutions accepted by a user or group of user, previous substitutions accepted by one or more other users (e.g., similar users, group profile), and/or product ranking data.

The server 130 can generate weighted scores 168 for products and substitute products. The weighted score 168 can include a combination of a distance metric and an acceptance probability score 160 for a product and substitute product. The server 130 can determine and assign a weight value to the distance metric, acceptance probability score 160 and/or product characteristics based in part on user preferences, store or retailer preferences and/or the characteristics of the missing product.

In some embodiments, the server 130 can provide, inject or transmit an application 118 (e.g., client application) at the device 126. The application 118 can be communicatively coupled to the server 130 and inventory database 132 of the server 130 to receive path information, receive updates to path information and/or provide a channel for the device 126 to provide feedback (e.g., unavailable product, product selection) to the server 130. In some embodiments, the application 118 can provide channel for a user of the device 126 to provide feedback (e.g., unavailable product, product selection) to the server 130 from the device 126. The server 130 can connect to a variety of different servers or databases to receive or provide inventory data and dynamically update a planned pick path 144.

Server 130 can include and maintain an inventory database 132. The inventory database 132 can include an inventory of the warehouse and/or an inventory of a plurality of commerce centers (e.g., warehouses, stores, fulfillment centres). The inventory database 132 can include product data 148, product location data 146 for products at one or more warehouses and substitute product data 148. The substitute product data 148 can include preference data, customer rankings and previous accepted substitutes. The server 130 can dynamically maintain and update the inventory database 132 including product information, availability and amount remaining. The inventory data can include, but is not limited to, current product amounts, product locations, check-out counter data, or employee device updates (e.g., re-stocks, removals, exceptions raised by other employees). In embodiments, the server 130 can dynamically update the inventory database 132 to reflect one or more products being taken (e.g., inventory depleted) and one or more products being restocked and dynamically update a planned pick path 144 for a user using data from the inventory database 132. In some embodiments, the server 130 can make a reservation for a product in a location in response to the product being requested reservation to dynamically update (e.g., modify, deplete) the inventory database 132 to reflect the one or more products being requested by the amount of product requested. When the product is retrieved (e.g., request fulfilled), the server 130 can fulfill the reservation to dynamically update (e.g., modify, deplete) the inventory database 132 by the amount of the one or more products retrieved (e.g., missing product, damaged product, alternate product retrieved). The reservation and picking of the one or more products can occur at different time and the server 130 can generate the reservation to plan for the removal of the one or more products from inventory before the one or more products are actually removed and provide a dynamic and consistent inventory state.

In some embodiments, the inventory database 132 can be maintained by a third party server and the server 130 can connect to the third party server to receive inventory data associated with one or more products. The server 130 can dynamically receive updates from the third party server responsive to one or more products being taken or sold (e.g., inventory depleted) and one or more products being restocked to dynamically update a planned pick path 144. The inventory data can include data from different stores or different retail shops located in a common environment (e.g., mall setting, warehouse for multiple companies). The server 130 can identify or select available products from other brands, different companies, or different retail locations from the brand, company, or retail location of the missing product to provide more options or to identify an available product having a higher acceptance probability score 160 and/or weighted score 168. The server 130 can track individual products or items to identify potential issues (e.g., missing products after path originally generated) with an active pick path 144 and/or to dynamically update an active pick path 144 such that the device 126 is not interrupted or stopped in performing the pick path 144 using the inventory database 132.

The server 130 and warehouse system 120 may include a network interface, one or more receivers and transmitter circuitry to communicate with the devices 126 within the warehouse and/or a customer device 126 of a customer 172. The server 130 and control system 122 of the warehouse system 120 can use the network interface to connect network 140 to establish one or more connections 134 between the server 130, warehouse system 120, and/or one or more devices 126. The network interface can include a wired interface, wireless interface or optical interface. The server 130 and control system 122 of the warehouse system 120 can communicate instructions 142, path data and inventory data through the network interface to one or more devices 126 and receive notifications (e.g., notifications 202 of FIG. 2) and product status updates through the network interface. The network interface can provide a connection to a wide area network (e.g., the Internet) to which the WAN interface of a remote server system is also connected. Network interface can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network 140 can include a public network, such as a wide area network (WAN) or the Internet, a private network such as a local area network (LAN) or a company Intranet, or a combination of a public network and a private network. The network 140 can employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network 140 can include a WiFi network. The network 140 can include a virtual private network (VPN). The VPN can include one or more encrypted connections 134 between a device 126, server 130 and/or control system 122 of warehouse system 120 over network 140 (e.g., internet, corporate network, private network). In some embodiments, device 126, server 130 and control system 122 of the warehouse system 120 may be on the same network 140. In some embodiments, one or more of device 126, server 130 and control system 122 of the warehouse system 120 may be on different networks 140. The network 140 can include one or more virtual private networks (VPNs).

The connections 134 can correspond to or be used to establish an application session, a browser session, and/or a remote application session. The connections 134 can be established using a communication protocol, including but not limited to, IEEE 802.11 based protocol, Bluetooth based protocol, WiFi based protocol or cellular based protocol. The connections 134 can include encrypted and/or secure sessions established between device 126, server 130 and control system 122 of the warehouse system 120. The encrypted connection 134 can include an encrypted file, encrypted data or traffic transmitted between device 126, server 130 and control system 122 of the warehouse system 120.

It should be appreciated that all references to products throughout this disclosure should also be understood to be references to products and/or services, including physical products, digital content, tickets, subscriptions, services to be provided, and the like. In some embodiments, references to customers, buyers, and users throughout this disclosure should also be understood to be references to groups of individuals, companies, corporations, computing entities, and the like, and may represent for-profit or not-for-profit exchange of products. A customer may include users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a service provider user (e.g., a shipping provider, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

Figure 2:
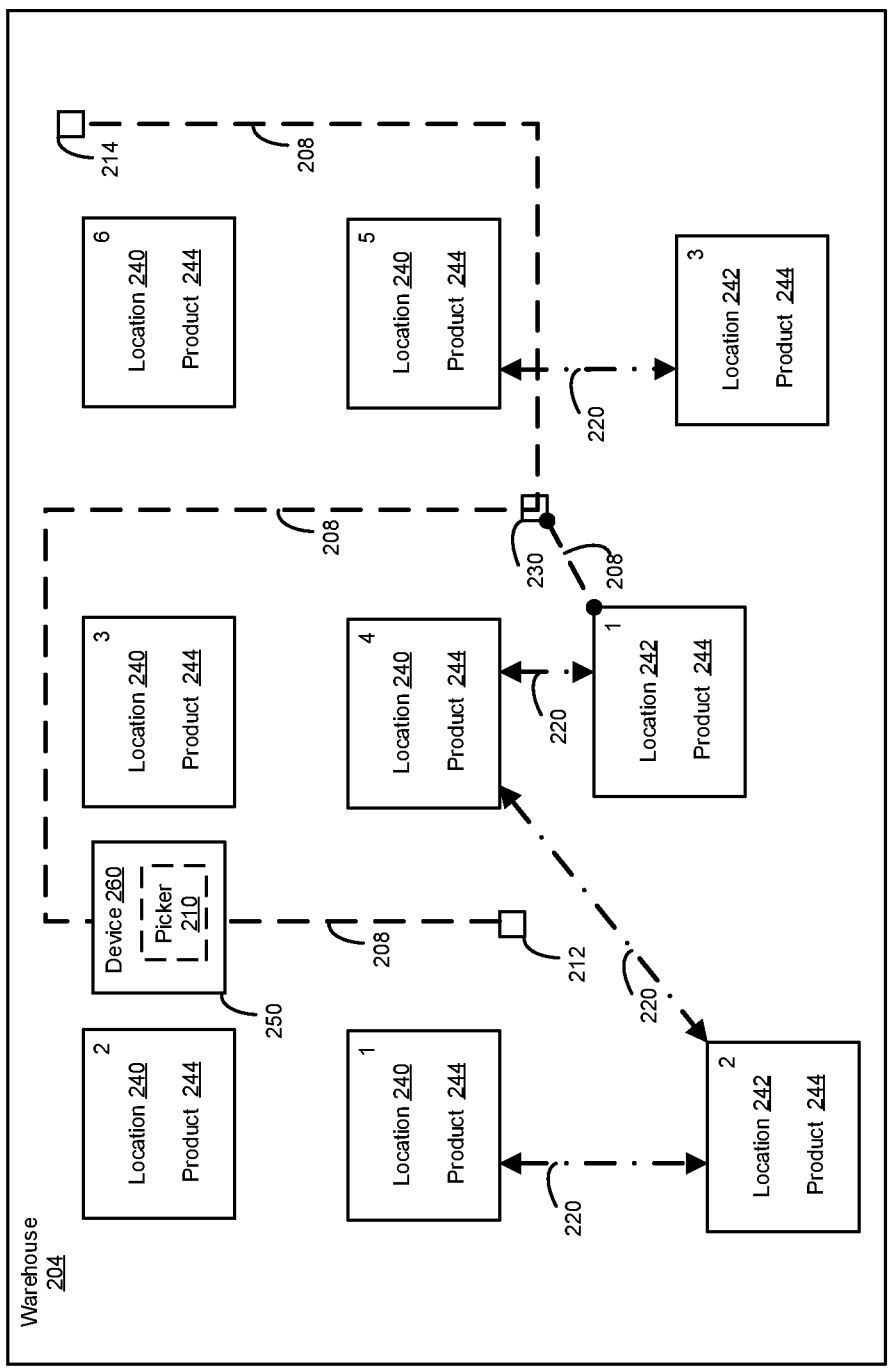
FIG. 2 is a diagram depicting a warehouse environment having a plurality of products and pick locations, in accordance with an embodiment.
Figure 2:
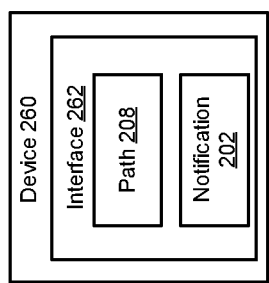

Referring now to FIG. 2, a diagram of a pick path 208 through a warehouse 204 is provided including a pick location 240. The pick path 208 can include or correspond to an original or initial path 208 generated based on the locations 240 of the originally requested products 244 within the warehouse 204. The pick path 208 can provide a route through the warehouse 204 for a device 260 to follow to select or retrieve the corresponding products 244. In some embodiments, the pick path 208 can correspond to a minimal or smallest total distance for the device 260 to travel through the warehouse 204 to select and/or retrieve the products 244 from the different locations 204 within the warehouse 204.

Figure 3A:
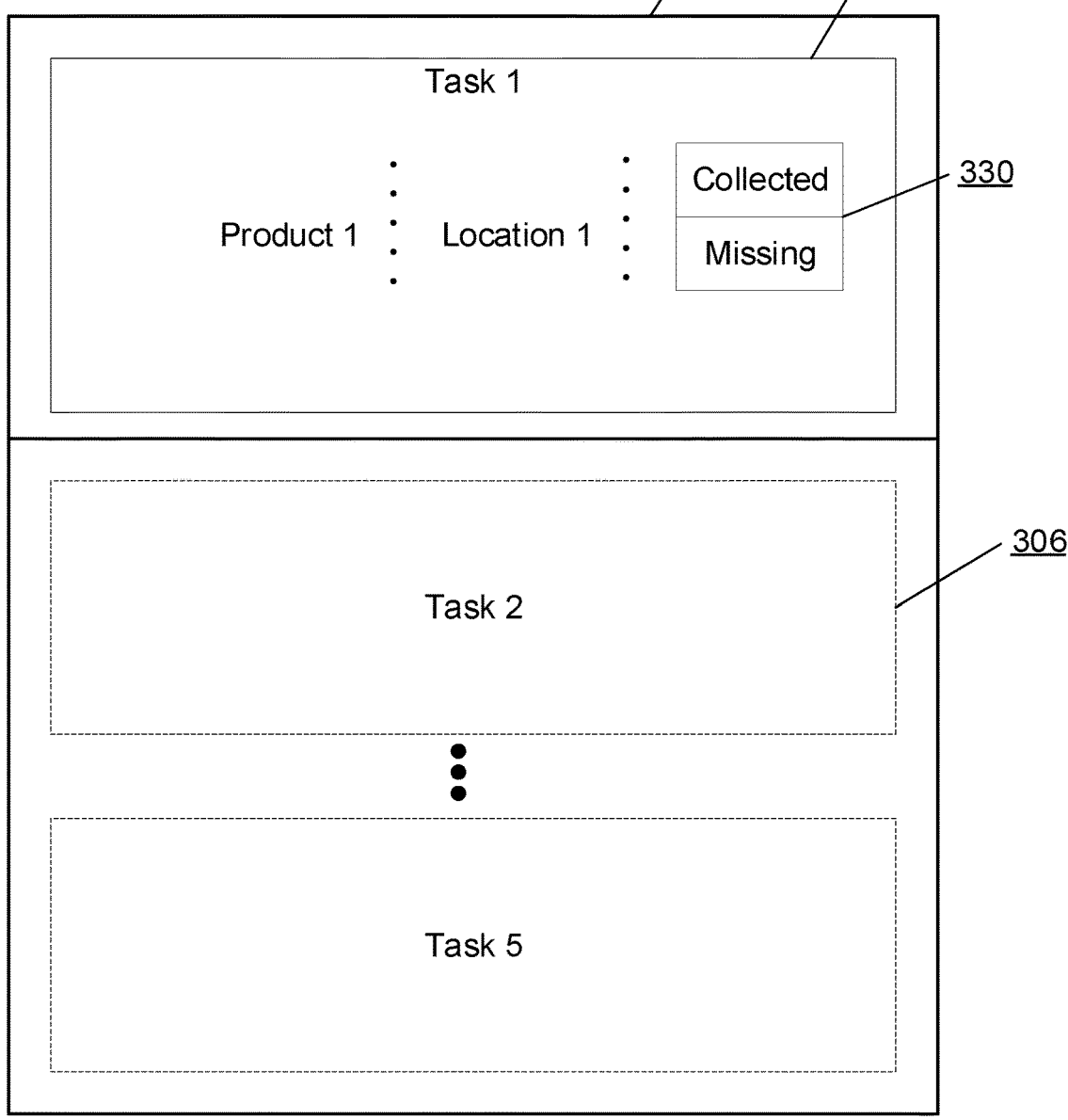
FIGS. 3A-3B are diagrams of pick paths and displays of picks paths on a user device, in accordance with an embodiment.
Figure 3B:
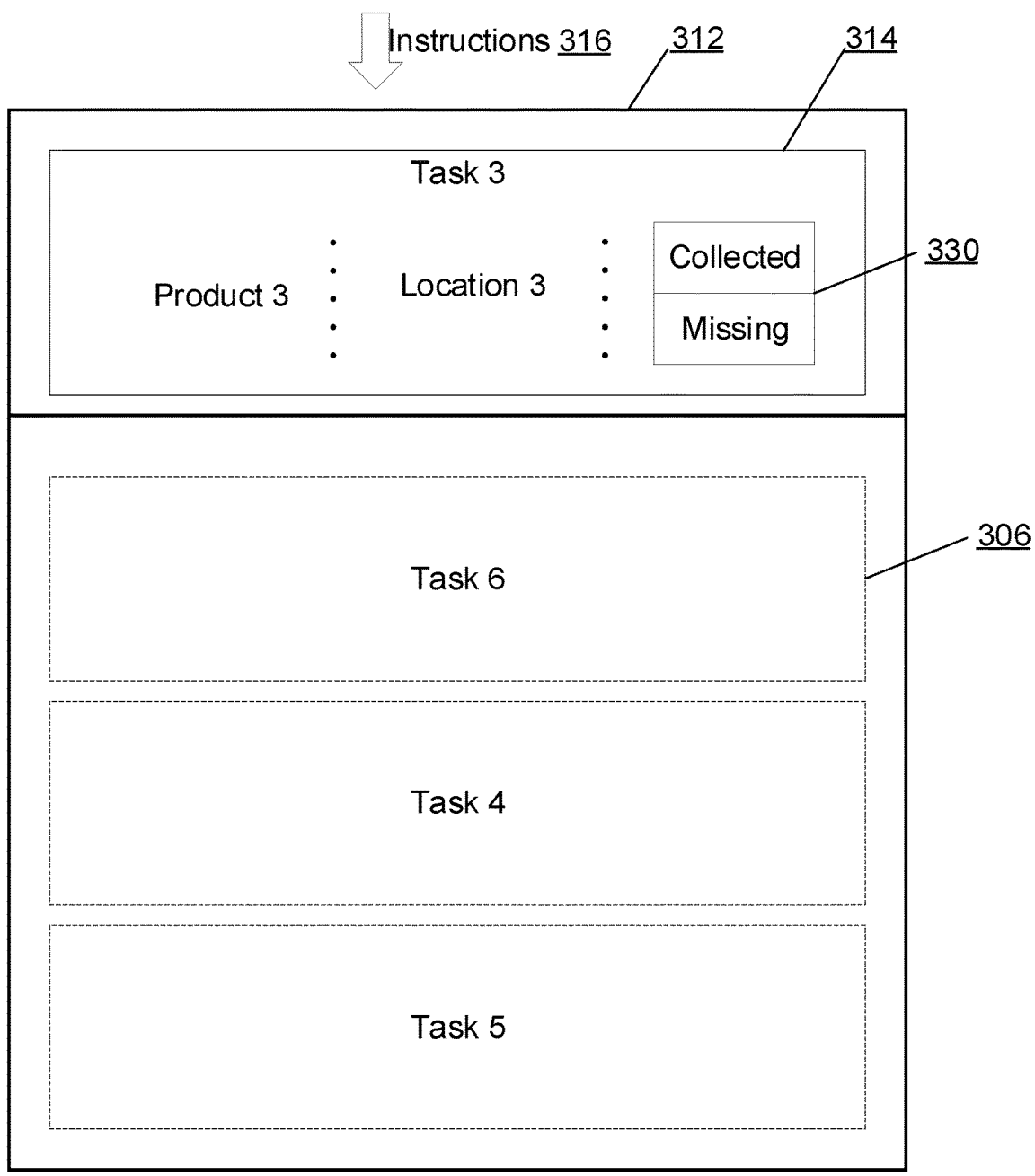

The device 260 (e.g., enhanced cart 102 of FIGS. 1A-1B, device 126 of FIG. 1C) can display the pick path 208 through an interface 262 of the device 260 (e.g., as illustrated in FIGS. 3A-3B). The device 260 can execute instructions associated with the pick path 208 to collect or retrieve one or more products 244 indicated in the pick path 208. The device 260 can execute the instructions to collect the products 244 in a determined order, for example, sequential order based in part on a position with the pick path 208 the respective location 240 and/or product is assigned or located. For example, the device 260 can execute instructions for a first location 240 for a first product 244 and wait to execute instructions for a second location 240 for a second product 244 until the first product 244 has been selected or a status (e.g., unavailable, selected) of the first product 244 has been provided through the device 260. The pick path 208 can include a starting point 212 and an end point 214 with each of the pick locations 240 at different points along the path 208. It should be appreciated that the pick path 208 can include a single location 240 or multiple locations 240 (e.g., two or more, more than six) with the number of pick locations 240 determined based in part on a number of products 244 to be selected.

The device 260 can execute the instructions and traverse the path 208 selecting and retrieving the corresponding products 244 from the respective locations 240. In some embodiments, a second product 244 may be unavailable at the second location 240. For example, the device 260 can determine that the second product 244 included in pick path 208 is not at the indicated second location 240 and can provide a notification 202 through the device 260 indicating a status of the product 244, for example, to a server or inventory database. The second product 244 may be sold out, stock depleted or otherwise not available at the second location 240 and/or at one or more other locations 240 (e.g., alternate locations) within the warehouse 204. The device 260 can generate and provide the notification 202 indicating that the product 244 is unavailable or otherwise unable to be selected at the warehouse 204 or update a status of the respective product 244 in an inventory database maintained at the device 260 using the notification 202. The notification 202 can indicate that the product 244 is missing, unavailable at the indicated location 240, and/or that no inventory exists for the desired product 244 at one or more alternate locations 240.

In embodiments, the device 260 can transmit or provide the notification 202 to a server. In some embodiments, the device 260 can attempt to establish a connection (e.g., WiFi connection) to the server after generating the notification 202 from the picker 210 (or receiving the notification 202 from a picker 210) to transmit the notification 202 to the server. The device 260 can continue to a next task in the pick path 208 while the device 260 attempts to establish a connection to the server. In some embodiments, the device 260 can transmit or provide the notification 202 to the server through an existing connection to the server after generating the notification 202 and the device 260 can continue to a next task in the pick path 208 while the server determines a substitute product 244 for the missing product 244.

The server can perform a query or lookup to identify one or more available products 244 (e.g., available for selection at the warehouse 204) as a substitute for the missing product 244. The device 260 can continue executing the instructions and traversing the pick path 208 to select the remaining products 244 included in the pick path 208 while the server determines a substitute for the missing product 244. The substitute product 244 can include a product 244 in the same product class (e.g., different type of peanut butter, different type of juice), a product 244 having different properties or are a different type of product 244 from the missing product 244. In some embodiments, the substitute product 244 can include available products 244 at the warehouse having the same or similar functionality, characteristics, and/or ingredients to the unavailable second product 244. In some embodiments, the server can access metadata for the one or more available products 244 to determine if the available products 244 are a proper substitute for the unavailable second product 244.

The server can choose from options for available products 244 based in part on a distance 220 from a current location 250 of the device 260, the original product location 240, or a location 240 of each available product 244 to one or more product locations 240 indicated in the pick path 208. In some embodiments, the server can identify multiple substitute products available at three different locations 240 within the warehouse 204, for example, a first substitute product 244 located a first substitute location 242, a second substitute product 244 located a second substitute location 242, and a third substitute product 244 located at third substitute location 242 are illustrated in FIG. 2. The server can determine distances 220 for each of the substitute products at the respective substitute locations 242 to the current location 250 of the device 260, the original product location 240, a closest or nearest remaining product 244 in the pick path 208, and a closest or nearest point 230 in the pick path 208. In some embodiments, the server can determine that the second substitute product 244 at the second substitute location 242 is positioned the shortest distance 220 or least distance 220 as compared to the distances 220 determined for the first and third substitute products 244. The server can determine that the second substitute product 244 at the second substitute location 242 is positioned the shortest distance 220 from the fourth location 240 and fourth product 244 in the original pick path 208.

The server can generate instructions to revise the pick path 208 to include the second substitute location 242 for the second substitute product 244 in the revised pick path 208. In some embodiments, while the device 260 is along the pick path 208 collecting the remaining products 244, the server can dynamically revise the pick path 208 to incorporate the selected, available substitute product 244 based on the distance 220 of the selected, available substitute product 244 from the original pick path 208. The server can transmit instructions for the revised path 208 to the device 260. In some embodiments, the device 260 can dynamically update, using the instructions, the display of the revised pick path 208 to include the substitute product location 242, for example, for a picker 210 traversing the pick path 208 with the device 260. The revised pick path 208 can include the substitute product location 240 as a next task in the revised pick path 208 or as a future task in the revised pick path 208. The device 260 can continue to execute the instructions for the pick path 208 and generate one or more notifications 202 indicating a status of a remaining product 244 in the pick path 208 until the pick path 208 is completed or until each of the products 244 available to be selected are collected by the device 260. The device 260 and server can continue to monitor the progress of the pick path 208 and, if requested, can dynamically select a substitute product 244 for an unavailable product and update the pick path 208 to include the location 242 for the substitute product 244.

In some embodiments, the device 260 and a picker 210 can execute instructions associated with the pick path 208 to collect or retrieve one or more products 244 indicated in the pick path 208. The device 260 can display the pick path 208 through an interface 262 of the device 260 (e.g., as illustrated in FIGS. 3A-3B). The device 260 can receive instructions indicating the pick path 208 and generate the display of the pick path 208 based in part on the received instructions for the picker 210. The interface 262 can include, but is not limited to, a display, touch screen, or graphical user interface. The device 260 and/or interface 262 can be communicatively coupled to an input device (e.g., user input device) to enable the picker 210 to interact with the path 208 and/or provide feedback corresponding to progress in completing the instructions of the pick path 208 using the device 260. The input device can include any device (or devices) via which a user can provide signals to the device 260 and/or server indicative of particular user feedback, requests, information, notification or interruption. The input device can include any or all of a keyboard, touch pad, touch screen, mouse or other pointing device, scroll wheel, click wheel, dial, button, switch, keypad, microphone, barcode scanner and/or sensors (e.g., a motion sensor, an eye tracking sensor, etc.).

The device 260 can display the locations 240 and/or products 244 in a determined order, for example, sequential order based in part on a position with the pick path the respective location 240 and/or product is assigned or located. For example, the device 260 can display a first location 240 for a first product 244 through the interface 262 and wait to display a second location 240 for a second product 244 until the first product 244 has been selected or a status (e.g., unavailable, selected) of the first product 244 has been provided to the device 260, for example, by the picker 210. The device 260 and picker 210 can execute the instructions and traverse the path 208 selecting and retrieving the corresponding products 244 from the respective locations 240. In some embodiments, a second product 244 may be unavailable at the second location 240. For example, the picker 210 can determine that the second product 244 included in pick path 208 is not at the indicated second location 240 and can provide a notification 202 through the device 260 indicating a status of the product 244, for example, to a server or inventory database. The second product 244 may be sold out, stock depleted or otherwise not available at the second location 240 and/or at one or more other locations 240 (e.g., alternate locations) within the warehouse 204. The picker 210 can provide the notification 202 through the device 260 indicating that the product 244 is unavailable or otherwise unable to be selected at the warehouse 204. The notification 202 can indicate that the product 244 is missing, unavailable at the indicated location 240, and/or that no inventory exists for the desired product 244 at one or more alternate locations 240. The picker 210 can continue to execute the instructions for the pick path 208 and generate one or more notifications 202 indicating a status of a remaining product 244 in the pick path 208 until the pick path 208 is completed or until each of the products 244 available to be selected are collected by the device 260 and picker 210.

Referring now to FIGS. 3A-3B, example embodiments of a pick path 310 (e.g., FIG. 3A) and a revised pick path 310 (e.g., FIG. 3B) are shown. In FIG. 3A, the pick path 310 list and device 312 showing tasks 302 associated with the pick path 310 are illustrated. The pick path 310 includes a plurality of tasks 302 and the device 312 can execute the tasks 302 of the pick path 310 in sequential order. In some embodiments, the device 312 can display the tasks 302 of the pick path 310 in sequential order and such that the tasks 302 are displayed one at a time through the interface 314 of the device 312. The device 312 can include a picker device operated by, used by or handled by a picker while collecting the products 322 included in the pick path 310. In some embodiments, each of the tasks 302 can include at least one location 320 and at least one product 322 to be collected at the respective location 320. The tasks 302 (a.so referred to herein as task blocks) can include a status 308 for each product 322 listed indicating if the respective product 322 has been collected, is missing (e.g., unavailable at intended location 320) or pending (e.g., pick not attempted yet, picker has not reached that product location 320). The pick path 310 can be generated, for example, in response to a request (e.g., listing) from a customer for one or more products available at a warehouse. The number of products 322 included in a pick path 310 can vary (e.g., one product 322, two or more products 322) and be selected based in part on the number of products 322 requested.

The tasks 302 can be ordered or arranged within the pick path 310 based on the locations 320 of the requested products 322. For example, the pick path 310 can be generated to correspond to the smallest distance or least distance through the warehouse to collect the requested products 322. The pick path 310 can be transmitted to the device 312 through instructions 316 that, in some embodiments, cause the device 312 to execute the tasks 302 of the pick path 310 in an order and arrangements as indicated by the instructions 316. The pick path 310 can be transmitted to the device 312 through instructions 316 that, in some embodiments, cause the device 312 to display the tasks 302 of the pick path 310 in an order and arrangements as indicated by the instructions 316. The instructions 316 can include a script, code or command including one or more data structures for a task 302 including the location information, product information and/or display information (e.g., position, size) within the interface 314 of the device 312. In some embodiments, the device 312 can receive the tasks 302 one at a time and execute and/or display the tasks 302 as they are received. For example, the device 312 can provide feedback when collecting a product and indicating the corresponding task 302 is completed (e.g., collected) or that the product 322 is unavailable and a substitute product may be requested. In embodiments, a picker can provide feedback through the device 312 when collecting a product and indicating the corresponding task 302 is completed (e.g., collected) or that the product 322 is unavailable and a substitute product may be requested. The device 312 can receive the next or subsequent task 302 for the pick path 310 responsive to providing the feedback indicating the previous task 302 was completed or that the product was unavailable. In some embodiments, the device 312 can receive all of the tasks 302 associated with the pick path 310 at the same time and maintain a pick queue 306 that includes the remaining or pending tasks 302 not yet attempted, completed or interacted with by the picker through the device 312. In FIG. 3A, the pending tasks 302 in the pick queue 306 are shown in a dashed box to represent that the tasks 302 may not be executed yet, displayed yet or visible to the picker and/or the picker may not be aware of what the pending tasks 302 in the pick queue 306 are until the respective task 302 is displayed through the interface 314 of the device 312.

In some embodiments, at least one of the products 322 may not be available at the location 320 indicated in the pick path 310. For example, a second product 322 included in the second task 302 may be missing, unavailable or otherwise not available at the warehouse for the picker to collect. The device 312 can generate a notification 330 indicating that the product 322 was missing and the device 312 can transmit the notification 330 to the server and request a substitute product 322 for the missing product 322. The device 312 can continue along the pick path 310 to attempt to collect the remaining products 322. Now referring to FIG. 3B, a revised pick path 310 is shown having a substitute product 322 inserted into the pick path 310 based in part on a distance of the location 320 of the substitute product 322 to one or more remaining products 322 in the pick path 310 and/or a point in the pick path 310. In some embodiments, a new substitute task 302 (here Task 6) can be generated for the substitute product 322 to identify the substitute product 322 and the location 320 of the substitute product 322. In some embodiments, the substitute task 302 can be inserted prior to an upcoming pick, here the fourth task 302 of the original pick path 310.

The server can transmit instructions 316 indicating the revised pick path 310 and the substitute task 302 for the substitute product 322. The device 312 can receive the instructions 316 and dynamically update the pick path 310 to include the substitute task 302 for the substitute pick 322. The instructions 316 can indicate a new order for the tasks 302 of the pick path 310 and include the substitute task 302 for the substitute product 322. In some embodiments, the device 312 can dynamically update the pick path 310 while continuing along the pick path 310. The instructions 316 can cause the device 312 to dynamically update the pick queue 306 to include the substitute task 302 as a next task 302 in the pick path 310 or update the pick queue 306 to include the substitute task 302 in the revised order of tasks 302 for the pick path 310. For example, the device 312 may be in the process of attempting to collect the product 322 for the third task 302 and the pick queue 306 can be updated such that the next task 302 executed by the device 312 and/or presented to a picker through the interface 314 of the device 312 is the substitute task 302 (e.g., Task 6) for the substitute product 322 when the device 312 generates a notification 330 indicating the product 322 for the third task 302 was collected or missing. The device 312 and server can continue to communicate to provide status updates the tasks 302 of the pick path 310 and/or substitute products 322 for any missing or unavailable products 322 in the pick path 310 until the pick path 310 is completed.

Figure 4:
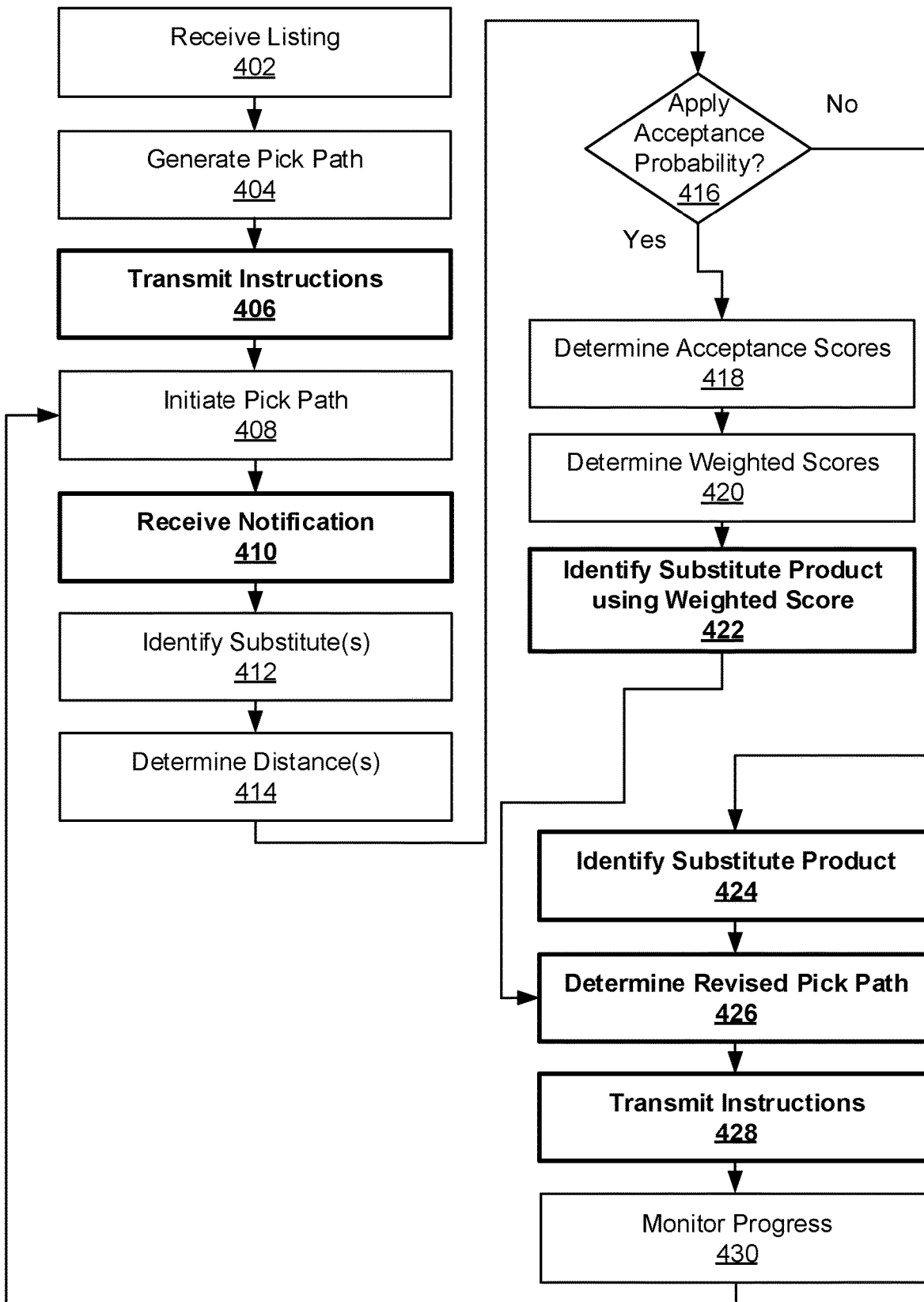
FIG. 4 is a flow diagram of a method for determining dynamic substitutions to minimize a distance, in accordance with an embodiment.

Referring now to FIG. 4, depicted is a flow diagram of an embodiment of a method 400 for determining dynamic substitutions to minimize a distance. In brief overview, the method 400 can include one or more of: receiving a listing 402, generating a pick path 404, transmitting instructions 406, initiating a pick path 408, receiving a notification 410, identifying a substitute 412, determining a distance 414, determining whether or not to apply an acceptance probability algorithm 416, determining an acceptance score 418, determining a weighted score 420, identifying a substitute using the weighted score 422, identifying a substitute using the distance 424, determining a revised pick path 426, transmitting instructions for the revised pick path 428, and monitoring the progress of the pick path 430. The functionalities of the method 400 may be implemented using, or performed by, the components detailed herein in connection with FIGS. 1A-3B and 5. In some embodiments, the server and device may perform one or more of the functionalities of method 400 together or independently. For example, in embodiments, the device may identify a substitute product, generate instructions, and revise a pick path independent of the server (e.g., no connection to server). In some embodiments, the device can receive a substitute product, instructions, and a revised pick path from the server.

Referring now to operation 402, and in some embodiments, a listing or request for one or more products can be received. A server can receive an order or request for a product or a listing of products. The order can include an online order for pick up or delivery request entered by a customer and identify one or more products stored, held or offered for sale at a warehouse (e.g., store, retail center, fulfillment center). In some embodiments, a customer, user or picker (e.g., store employee, warehouse employee) can enter the order through a device and the device can transmit the order or listing of products to the server. In one embodiment, a customer can place the order online through an application executing on a client device of the customer and communicatively coupled to the server and request one or more products to be picked at the warehouse or request one or more products be delivered to a particular location (e.g., home, work).

Referring now to operation 404, and in some embodiments, a pick path can be generated. The server can determine a pick path to select or retrieve the requested products from one or more locations within the warehouse. The pick path can include a route through the warehouse identifying a location (e.g., pick location) for each of the requested products and/or a quantity of the respective product to be collected. The server can determine if the warehouse has the requested products in stock at the warehouse based in part on a current or recent inventory of the warehouse and/or if the warehouse has the requested quantity. In some embodiments, the server can access an inventory database to determine the current or recent inventory of the warehouse. The inventory database can be maintained by the server or by a third party server, for example, of the warehouse or a delivery service providing the products to the warehouse.

The server can determine at least one location within the warehouse for each of the requested products. In some embodiments, the server can determine if the product is located, stored or displayed at multiple locations within the warehouse and select the location that is closest to a tentative pick path and/or one or more other products included in the order. The server can generate the pick path to include the locations for the products requested. The pick path can include a plurality of tasks (e.g., picking tasks) or units of work, and each task can identify at least one product, a location for the respective product and a quantity of the product. The tasks can include or correspond to a data structure that includes a product identifier for the respective product, the location for the product to be collected and a quantity of the respective product. The order of the tasks and the locations in the pick path can be arranged or selected such that a shortest route (e.g., least total distance) through the warehouse is selected for a device (e.g., enhanced cart, robotic device) to select or retrieve the products. In some embodiments, the server can generate multiple pick paths through the warehouse based on the locations of the products and select the pick path having the least total distance.

Referring now to operation 406, and in some embodiments, instructions can be transmitted. The server can transmit instructions corresponding to a pick path through a location where products are stored to collect a plurality of products stored at locations along the pick path. In some embodiments, the server can generate and transmit the instructions indicating the pick path through the warehouse to a device. The server can establish or maintain a connection (e.g., WiFi connection) to the device to transmit the instructions to the device. The device can include an enhanced cart (e.g., autonomous cart), a user device (e.g., picker device), client device, customer device (e.g., mobile phone, handheld computing device), robotic device or any form of computing device described here. The instructions can include the plurality of tasks for the pick path, the locations for the products, identifiers for the products, and/or a quantity for the individual products. In some embodiments, the instructions when received at the device, can cause the device to execute the pick path in an order indicated by the instructions. For example, the instructions can cause the device to execute one or tasks in a sequential order based on an order of the product along the pick path. In some embodiments, the instructions when received at the device, can cause the device to display the pick path through an application executing on the device. The instructions can indicate an order to display or provide the tasks for the pick path to a user through the device. For example, the instructions can cause the device to display or provide the tasks in a sequential order based on an order of the product along the pick path. In some embodiments, the instructions can cause the device to present the locations for products along the pick path one at a time based on an order of the products along the pick path.

Referring now to operation 408, and in some embodiments, a pick path can be initiated. A device can begin or initiate selecting products indicated in the pick path. In some embodiments, the device can include a robotic machine or robotic picker and the robotic device can begin selecting products indicated in the pick path, for example, using the instructions. The device can execute the instructions to perform one individual task for a location and product at a time as the device progresses through the path such that upon completion of a first task (e.g., select or retrieve first product at a first location, identify product as missing), a second task for a second location and product is provided to the device and executed to select the second product. In some embodiments, the device can include a robotic machine or robotic picker and the robotic device can begin selecting products indicated in the pick path, for example, using the instructions. In some embodiments, a picker can begin or initiate selecting products indicated in the pick path using the device. The picker can activate the device or an application on the device to receive a first task identifying a location for a first product along the path.

Referring now to operation 410, and in some embodiments, a notification can be received. The device can determine that at least one product is not at the indicated location as indicated in the pick path and generate or provide a notification (e.g., exception, interruption, feedback) identifying the missing or unavailable product, the location where the product was unavailable and/or if the requested quantity of the product is not available. The notification can indicate that the product is missing, unavailable at the indicated location, and/or that no inventory exists for the desired product at one or more alternate locations. The notification can indicate a status of the product, a product identifier for the missing product, and a location of the picker along the pick path. In some embodiments, the notification can be received from a picker through a client application executing on the device and displaying the task associated with the missing product.

In some embodiments, the device can receive the notification from an inventory database or inventory management system indicating an interruption (e.g., unable to satisfy a task due to missing product) associated with at least one product included in the listing. The inventory database may determine that the product was recently taken from the location (e.g., collected by a different device, picker, or customer), purchased or otherwise removed from the location prior to the device reaching the location of the product. The inventory database can transmit the notification to the device and/or the server for the device and/or server to identify a substitute product and revise the pick path. The device can continue on the pick path until a connection is established from the device to the server to transmit or upload the notification to the server. In some embodiments, the device can continue on the pick path after the device transmits or uploads the notification to the server such that the execution and progress of the pick path is not delayed or stopped while a substitute product is identified.

Referring now to operation 412, and in some embodiments, one or more substitute products can be identified. In some embodiments, the device can determine one or more available products (e.g., available at the warehouse) as a substitute for the missing product. In some embodiments, the device can transmit the notification to the server and the server can determine one or more available products (e.g., available at the warehouse) as a substitute for the missing product. For example, the device can receive the notification and attempt to establish a connection to the server to transmit or upload the notification to the server or use an existing connection between the server and the device to transmit or upload the notification.

The server or device can perform a query or lookup to identify one or more available products as a substitute for the missing product. The query can include the name of the missing product, a type of product, a product class, a property of the product, characteristics of the product, ingredients of the product, and/or functionality of the product. The server or device can query an inventory of the warehouse or an inventory database to identify the potential substitute products. In some embodiments, the server can include or maintain a listing or grouping of substitute products that are identified as potential substitutes for a product. The listing of substitute products can be determined based in part on previous selections, customer input, and/or metadata associated with the respective products. The server or device can query the listing of substitute products to identify the potential substitute products for the missing product. In some embodiments, the substitute product can include a product in the same product class, a product having different properties or are a different type of product from the missing product. The substitute product can include the same product requested but located in a different storage location or a replacement product (e.g., different brand of same type of the requested product). The substitute product can include available products at the warehouse having the same or similar functionality, characteristics, and/or ingredients to the unavailable second product. In embodiments, the substitute product can include a different product or different sized (e.g., different version) of the requested product. In some embodiments, the server can determine that no substitute product is available or that no substitute product in the requested quantity is available. The server can transmit instructions indicating to skip or continue the pick path without collecting a substitute product. The server can transmit instructions indicating to collect a substitute product in a different amount or quantity from the quantity requested for the original product that is unavailable.

Referring now to operation 414, and in some embodiments, a distance can be determined. The server or device can determine a distance or distance metric for each of the identified potential substitute products. In some embodiments, the server or device can determine multiple distance metrics for each of the identified potential substitute products. The distance metric can include a distance measurement from a location of the substitute product to one or more locations within the warehouse. For example, the distance metric can include a distance from a location of the substitute product in the warehouse to one or more points along the pick path. The distance metric can include a distance from a location of the substitute product to a location of the missing or unavailable product. The distance metric can include a distance from a location of the substitute product in the warehouse to a location of one or more products (e.g., remaining products) included in a pick path, including a current or active pick path that a device is actively traversing within the warehouse. The distance metric can include a distance from a current position of the picker or device along the pick path or within the warehouse to the location of the substitute product. The server can identify multiple locations for a substitute product within the warehouse and determine one or more distance metrics for each of the different locations for the substitute product. In some embodiments, the server can access an inventory database to retrieve or determine one or more distance metrics for one or more substitute products.

Referring now to operation 416, and in some embodiments, a determination can be made whether or not to apply an acceptance probability algorithm to select the substitute product. The server or device can determine whether or not to select the substitute product using the distance metric or an acceptance probability score or a weighted score that is a combination of the distance metric and an acceptance probability score for a substitute product. The server can make the determination based in part on a customer preference (e.g., indicated in customer profile), store policy (e.g., policy for warehouse or company), and/or a policy for a particular product or type of product. For example, certain products may have limited available substitute products or a large number of potential substitute products and the server can assign a substitute policy to the respective product or product class indicating if substitutes can be selected using the distance metric, acceptance probability score or weighted score. In some embodiments, the server or device can use feedback, for example submitted responsive to being notified that the original product is unavailable, from the device, customer or picker to determine whether to use the distance metric, acceptance probability score or weighted score to select a substitute product.

Referring now to operation 418, and in some embodiments, an acceptance probability score can be determined. The server can determine, using an acceptance algorithm, acceptance probability scores for the potential substitute products and/or a set of products in a same product class to identify the one or more available products. The acceptance probability score can indicate a likelihood that a user or customer will accept or agree to the available substitute product. The server can execute the acceptance probability algorithm using input data associated with multiple possible available products (e.g., potential substitute products) for the missing product to generate acceptance probability scores for the possible available products for the missing product. In some embodiments, the acceptance probability algorithm can consider or use as inputs the substitute products identified with respect to 412, products in a same product class as the missing product, data associated with previous substitutions accepted by the user, previous substitutions accepted by one or more other users (e.g., similar users, group profile), and/or product ranking data. The server can apply the acceptance probability algorithm (e.g., machine learning algorithm, artificial intelligence (AI) techniques) to the one or more substitute products to determine acceptance probability score for the potential substitute products identified for the missing product.

The server or device can perform a query or lookup to retrieve a set of possible available substitute products for the missing desired product based in part on the acceptance probability score assigned or attached to each of the potential substitute products. The server or device can use the determined acceptance probability scores to query an inventory database and receive or retrieve the set of possible available substitute products. In some embodiments, the server or device can perform the query or lookup using the acceptance probability scores and an acceptance threshold. The server or device can compare the acceptance probability scores for the potential substitute products to the acceptance threshold to generate a list of potential substitute products and search the inventory database for the products having an acceptance probability score greater than the acceptance threshold.

In some embodiments, the server or device can select the available product having the highest acceptance probability score as the substitute product for the missing product or use an acceptance threshold. For example, the server or device can generate the list of potential substitute products based in part on the acceptance probability score for the respective product being greater than or above the acceptance threshold. In other embodiments, the method 400 can move to 420 to determine a weighted score using the acceptance probability score. The server or device can determine a weighted score for each of the products included in the list of potential substitute products and/or products having an acceptance probability score greater than or above the acceptance threshold and use the weighted score to select the substitute product.

Referring now to operation 420, and in some embodiments, a weighted score can be determined. The server or device can determine or apply a weighted score to each available product (e.g., potential substitute products and/or a set of products in same product class) of the one or more available products based on the acceptance probability score and the distance metric (e.g., at least one distance metric, lowest distance metric) for the respective available product. The weighted score for a potential substitute product can be generated using a distance metric, an acceptance probability score and/or other product characteristics of the substitute product and/or missing product. The server can determine and assign a weight value to the distance metric, acceptance probability score and/or product characteristics. The weight value can vary based in part on user preferences, store or retailer preferences and/or the characteristics of the missing product. In some embodiments, the distance metric and acceptance probability score can be assigned the same or equal weight value. In some embodiments, the distance metric and acceptance probability score can be assigned different weight values (e.g., distance metric higher than acceptance probability score, distance metric higher than acceptance probability score) such that the distance metric or acceptance probability score have a greater or lesser degree of importance in the weighted score for the substitute product. In some embodiments, the weighted score can indicate a substitute product having a minimum distance (or within a threshold range) and highest acceptance probability score (or above a threshold value). In one embodiment, the server can determine the weighted score by multiplying the acceptance probability score for a substitute product with the corresponding distance metric for the substitute product. The server can select the substitute product having the lowest weighted score which corresponds to the product of the acceptance probability score and the corresponding distance metric for the respective substitute product.

Referring now to operation 422, and in some embodiments, a substitute can be identified using the weighted score. The server or device can select or identify a substitute product for the missing product using the weighted score. The server or device can compare the weighted scores for each of the identified available products or potential substitute products and select the substitute product having the highest weighted score as compared the weighted scores determined for the remaining available products or potential substitute products. In some embodiments, the server or device can select the substitute product having the lowest weighted score based in part on the weight values used to generate the weighted scores for the potential substitute products. The method 400 can move to 426 to generate instructions for the selected substitute product and to revise the pick path.

Referring now to operation 424, and in some embodiments, a substitute product can be identified using the distance. The server or device can identify a substitute product for the particular product (e.g., missing product) based on a distance from a location of the one more available products to a location or point along the pick path and/or other distance metrics as discussed herein (e.g., distance from another product, current location of the device). The server or device can use the distance metric to select the substitute product that has the lowest minimum distance from the pick path. The server can compile or arrange the distance metrics for each of the determined available products or substitute products and select the available product having the lowest or least distance value. In some embodiments, the server can select the available product that changes or increases a total distance of the pick path by the least or lowest amount or causes the least deviation from the original pick path. In some embodiments, the server can select the product having the lowest or least distance value from one or more locations of the other products to be picked. For example, the server can generate a new pick path or remap the original pick path in response to identifying a substitute product and select the substitute product that is nearest to at least one other product not yet picked. In embodiments, the locations of the remaining products to be picked can remain the same and the overall pick path can be updated, remapped or a new pick path generated to include the location of the available substitute product and the locations of the remaining products to be picked. The server can select the available substitute product that causes a total distance of the remapped pick path or new pick path to be a lowest value (e.g., as compared to other possible substitute products) based on a distance from the locations of other products not yet picked.

The server can select the substitute product based in part on a distance from one or more pick locations of products not yet retrieved and identified in the pick path. For example, the server calculates a distance between the location of each of the one or more available products and each of the upcoming pick locations on the pick path. The server can compare the distance values of each available product to points along the originally planned pick path. The server can select the available product that is located the minimum distance from at least one upcoming pick location or a location during a transition to pick another item (e.g., between two upcoming pick locations of the originally planned pick path).

In some embodiments, the server or device can select the substitute product based in part on feedback or a selection from a customer. The server and/or device can communicate with a client application executing on a client device of the customer (e.g., buyer) to receive feedback from the customer as the picker executes the pick path while the customer is positioned at a different location (e.g., home, work). The customer can provide feedback through the application and the server and/or device can update the pick path based in part on the feedback or in response to a request for feedback. For example, the server or device can generate a request to the customer, through the application executing on the client device, indicating the missing product and requesting a selection of a substitute product. The request can include a listing or ranking of possible substitute products selected based on properties of the missing product, the product class, customer preferences (e.g., previous substitute selections) and/or acceptance probability scores assigned to the potential substitute products. The customer can select a single substitute product or multiple substitute products, for example, and include a ranking or preference for each of the multiple substitute products. The server or device can receive the customer selected substitute product or multiple substitute products and the method 400 can move to 412 to determine a distance metric for the selected substitute product or multiple substitute products.

Referring now to operation 426, and in some embodiments, a revised pick path can be determined. The server can determine a revised pick path using the selected substitute product and the location for the substitute product. In embodiments, the server can generate instructions to revise the pick path. For example, the instructions can include a script or code that updates or revises the pick path and/or tasks indicated by the pick path to include the task for the substitute product and the substitute product location among the remaining tasks in the pick path. The instructions can cause or instruct the device to insert the location of the selected substitute product in the revised pick path before or after the upcoming pick location that is positioned the minimum distance from the location of the substitute product to reduce the deviation from the originally planned pick path or minimize a change in a total distance of the pick path. The server can generate a new task (e.g., unit of work, pick task) for the substitute product and positioned within the pick path to include the new task, including, prior to or after the task corresponding to the minimum point or minimum distance. In some embodiments, the server can revise the pick path to insert the location of the substitute product in the revised pick path at the same position (e.g., same pick position) along the pick path as the original or missing product such that the order of pick locations of the pick path remains the same and the location of the missing product and respective pick order position is replaced by the location of the substitute product. In some embodiments, the server or device can change the order of pick locations so as to move the original location of the missing product to be before or after other products in the planned pick path based on location of the selected substitute product.

In some embodiments, the server can generate the instructions to include multiple substitute products and the device can select a substitute product upon receiving the instructions and based in part on a current pick location, current location of the picker and/or current location of the device within the warehouse. In some embodiments, the pick path can be revised such that the device or picker using the device may not know or be aware that the server is revising the pick path as the device is working or collecting products. For example, as the device continues along the planned pick path, the server can dynamically update the pick path to include one or more available substitute products and a location for the available substitute products to eliminate or reduce any interruption to the execution of the planned pick path. The picker using the device may be unaware the active pick path is being updated or revised as the server and device can continuously monitor and update the pick path based on the progress during execution of the pick path. In some embodiments, while the device is along the pick path collecting the products, the server and/or device can dynamically revise the pick path to incorporate the selected, available substitute product. The server can transmit the instructions for the revised pick path to include the location for the substitute product while the device continues collecting the other products along the pick path. The device can dynamically update (e.g., as the picker is actively executing the instructions for the pick path) the pick path to include the location for the available substitute product. The revised pick path may include the substitute product as the next task in the pick path or as a future task in the pick path. In some embodiments, the revised pick path may include the substitute product as the next task in the pick path or as a future task in the pick path and the picker may not see or be provided the task for the substitute product through the device until the picker gets to the respective task in the pick path.

Referring now to operation 428, and in some embodiments, instructions can be transmitted. The server can transmit the instructions to revise the pick path to include the location of the selected substitute product. The instructions can identify a point in the pick path to insert the location for the substitute product. The instructions can identify a revised or new order of products to be picked in the revised pick path including the remaining products locations from the original or previous pick path (e.g., prior to revision) and the location for the substitute product. The instructions can include a new task or unit of work for the selected substitute product and the location of the substitute product and a position within the pick path to insert or add the new task for the selected substitute product among the tasks for the remaining products locations from the original or previous pick path. The server can transmit instructions for the revised pick path and substitute product to the device through an existing connection. In some embodiments, the server can establish a connection to the device and transmit the instructions for the revised pick path through the new connection.

The device can receive the instructions for the revised pick path and the substitute product and revise the original pick path or current pick path the picker is executing (or generate new pick path). In some embodiments, the instructions when received at the device can cause the device to update or revise the pick path. For example, the instructions can include a script or code that updates or revises the pick path and/or tasks indicated by the pick path to include the task for the substitute product and the substitute product location among the remaining tasks in the pick path. The instructions can cause or instruct the device to insert the location of the selected substitute product in the revised pick path before or after the upcoming pick location that is positioned the minimum distance from the location of the substitute product to reduce the deviation from the originally planned pick path or minimize a change in a total distance of the pick path. In some embodiments, the device can request an updated task block from the server for the substitute product and receive a response from the server including the updated or new task block for the substitute product. The device can update the pick path to include the updated or new task block for the substitute product (e.g., replace the task block for the missing or unavailable product). In some embodiments, the device can determine (e.g., make determinations, decisions) to update or augment a pick path to replace a task block for a missing or unavailable product with a task block for a selected substitute product. In other embodiments, the device can execute the task blocks (e.g., instructions/commands of task block) as received from the server for a pick path, including task blocks for a substitute product, to retrieve one or more products identified by the respective task blocks at the respective locations.

In some embodiments, the instructions can include multiple substitute products and the device can select a substitute product using the instructions and a current pick location, current location of the picker and/or current location of the device within the warehouse. For example, as the device executes the instructions for the pick path to traverse the planned pick path, the server can connect to the device and, once the connection is established, the server can provide the instructions to the device to dynamically revise the pick path based in part on the current pick location, current location of the picker and/or current location of the device. The instructions can include a code or script that detects the current pick location, current location of the picker and/or current location of the device. The current pick location, current location of the picker and/or current location of the device can be different from the pick location, location of the picker and/or location of the device when the notification was originally transmitted or provided indicating the missing product (e.g., device has moved on to next pick location). The device can determine the new or current pick location, current location of the picker and/or current location of the device and select the substitute product that is closest or the least distance from the current pick location, current location of the picker and/or current location of the device. The device can execute the instructions to revise the pick path to include the location of the selected substitute product in the revised pick path.

Referring now to operation 430, and in some embodiments, the progress of the pick path can be monitored. The server and device can continue to monitor the progress of the planned and/or revised pick path and the progress of the device collecting the products indicated in the pick path. The server and device may maintain a connection as the device continues collecting products along the pick path and receive status updates or subsequent notifications through the connection. In some embodiments, the device can establish a connection to the server responsive to each notification received, status update or other forms of interaction between the device and the server. For example, the device can attempt to establish a connection when the device generates feedback or a notification indicating a status of the pick path and/or status of a product in the pick path. The feedback or status can indicate that the pick path is complete (e.g., each product is collected), partially complete (e.g., a subset of the products were collected), the pick path was stopped, a particular product was collected, a particular product is missing or unavailable and/or a change in an order or request (e.g., customer feedback adding a product or canceling a product) causing an interruption to the pick path. In some embodiments, the device can attempt to establish a connection when the device receives feedback from a picker indicating a status of the pick path and/or status of a product in the pick path. The device can transmit or upload the notification or status update to the server responsive to establishing the connection to the server. If the device receives a subsequent notification indicating another missing product, the method 400 can return to operation 408 to continue the pick path and identify one or more substitute products for the missing product.

Figure 5:
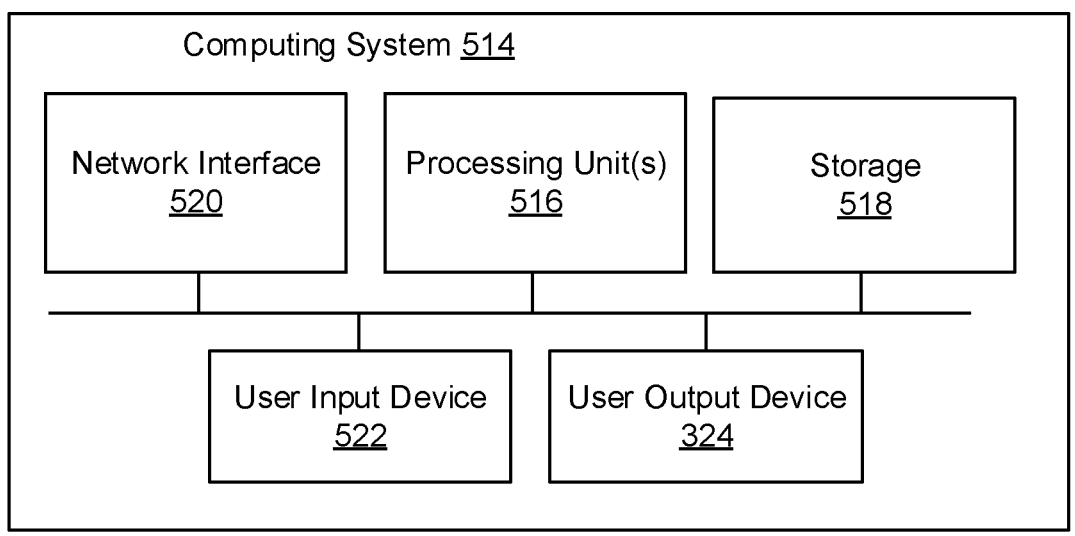
FIG. 5 is a block diagram of a computing environment, in accordance with an embodiment.

Various operations described herein can be implemented on computer systems. FIG. 5 shows a block diagram of a representative computing system 514 usable to implement the present disclosure. In some embodiments, the device 126, server 130 and control system 122 of FIG. 1C are implemented by the computing system 514. Computing system 514 can be implemented, for example, as a consumer device such as a desktop computer, laptop computer, smartphone, other mobile phone, tablet computer, wearable computing device, server computing device, or implemented with distributed computing devices. The computing system 514 can be implemented to determine inventory of a warehouse, monitor status of products maintained at a warehouse, and/or determine substitute products. In some embodiments, the computing system 514 can include conventional computer components such as processors 516, storage device 518, network interface 520, user input device 522, and user output device 524.

Network interface 520 can provide a connection to a wide area network (e.g., the Internet) to which the WAN interface of a remote server system is also connected. Network interface 520 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 522 can include any device (or devices) via which a user can provide signals to computing system 514; computing system 514 can interpret the signals as indicative of particular user requests or information. User input device 522 can include any or all of a keyboard, touch pad, touch screen, mouse or other pointing device, scroll wheel, click wheel, dial, button, switch, keypad, microphone, barcode scanner, sensors (e.g., a motion sensor, an eye tracking sensor, etc.), robotic device, robotic cart, and so on.

User output device 524 can include any device via which computing system 514 can provide information to a user. For example, user output device 524 can include a display to display images generated by or delivered to computing system 514. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that functions as both input and output device can be used. Output devices 524 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operations indicated in the program instructions. Examples of program instructions or computer code include machine code, such as is produced by a compiler, and files including higher-level code that are executed by a computer, an electronic component, or a microprocessor using an interpreter. Through suitable programming, processor 516 can provide various functionality for computing system 514, including any of the functionality described herein as being performed by a server or client, or other functionality associated with message management services.

It will be appreciated that computing system 514 is illustrative and that variations and modifications are possible. Computer systems used in connection with the present disclosure can have other capabilities not specifically described here. Further, while computing system 514 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

In one embodiment, a computer-implemented method may include transmitting, by a computer, instructions corresponding to a path through a location where products are stored to collect a plurality of products stored at locations along the path. In response to receiving a notification for a particular product of the plurality of products that the particular product is not at the location where it is stored, the computer may modify the path to include a location of a substitute product for the particular product. The modifying may include identifying a substitute product for the particular product based on a distance from a location of the one more available products to a location along the path. The computer may determine a revised path with the substitute product. The computer may transmit instructions for the revised path to include the location for the available product.

In some implementations, the computer may generate the instructions for the path including a plurality of picking tasks. Each of the picking tasks may include a product identifier and a location for a product to be collected. The computer may present, for display on an interface, one or more tasks of the plurality of tasks in sequential order based on the instructions for the path. In some implementations, the computer may receive, from a client application executing on the computer, the notification indicating a status of the product, a product identifier, and a location of a picker along the path.

In some implementations, the computer may determine, using an acceptance algorithm, acceptance probability scores for a set of products in a same product class to identify the one or more available products. In some implementations, the computer may apply a weighted score to each available product of the one or more available products based on the acceptance probability score and the distance. In some implementations, the computer may receive, from a third party server, data indicative of an inventory. The computer may determine,3 based on the data, the one or more available products based on the inventory.

In some implementations, the computer may select the available product that minimizes a length of the revised path. In some implementations, the computer may adjust the path to include the available product and the location as a task having a least distance from an unpicked product of the plurality of products along the path.

In another embodiment, a system includes at least one processor. The at least one processor can be configured to transmit instructions corresponding to a path through a location where products are stored to collect a plurality of products stored at locations along the path. The at least one processor can be configured to, in response to receiving a notification for a particular product of the plurality of products that the particular product is not at the location where it is stored, modify the path to include a location of a substitute product for the particular product. The at least one processor can be configured to identify a substitute product for the particular product based on a distance from a location of the one more available products to a location along the path. The at least one processor can be configured to determine a revised path with the substitute product. The at least one processor can be configured to transmit instructions for the revised path to include the location for the available product.

In some implementations, the at least one processor can be configured to generate the instructions for the path including a plurality of picking tasks. Each of the picking tasks can include a product identifier and a location for a product to be collected. The at least one processor can be configured to present, for display on an interface, one or more tasks of the plurality of tasks in sequential order based on the instructions for the path.

In some implementations, the at least one processor can be configured to receive, from a client application executing on a computer, the notification indicating a status of the product, a product identifier, and a location of a picker along the path. In some implementations, the at least one processor can be configured to determine, using an acceptance algorithm, acceptance probability scores for a set of products in a same product class to identify the one or more available products. The at least one processor can be configured to apply a weighted score to each available product of the one or more available products based on the acceptance probability score and the distance.

In some implementations, the at least one processor can be configured to receive, from a third party server, data indicative of an inventory. The at least one processor can be configured to determine, based on the data, the one or more available products based on the inventory. In some implementations, the at least one processor can be configured to select the available product that minimizes a length of the revised path. In some implementations, the at least one processor can be configured to adjust the path to include the available product and the location as a task having a least distance from an unpicked product of the plurality of products along the path.

In another embodiment, a non-transitory computer readable medium storing instructions when executed by one or more processors may cause the one or more processors to perform operations. The operations can include transmitting instructions corresponding to a path through a location where products are stored to collect a plurality of products stored at locations along the path. The operations can include, in response to receiving a notification for a particular product of the plurality of products that the particular product is not at the location where it is stored, modifying the path to include a location of a substitute product for the particular product. The modifying can include identifying a substitute product for the particular product based on a distance from a location of the one more available products to a location along the path. The operations can include determining a revised path with the substitute product. The operations can include transmitting instructions for the revised path to include the location for the available product.

In some implementations, the operations can include generating the instructions for the path including a plurality of picking tasks. Each of the picking tasks can include a product identifier and a location for a product to be collected. The operations can include presenting, for display on an interface, one or more tasks of the plurality of tasks in sequential order based on the instructions for the path.

In some implementations, the operations can include determining, using an acceptance algorithm, acceptance probability scores for a set of products in a same product class to identify the one or more available products. In some implementations, the operations can include applying a weighted score to each available product of the one or more available products based on the acceptance probability score and the distance.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc. are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:
1. A computer-implemented method comprising:
transmitting, by a computer to a autonomous vehicle, instructions corresponding to a path for the autonomous vehicle to collect a plurality of products stored a plurality of corresponding product storage at locations along the path;
in response to receiving a notification for a particular product of the plurality of products that the particular product is not at a corresponding product storage location where the particular product is stored, modifying the path to include the product storage location of a substitute product for the particular product, the modifying including:
determining, by the computer using an acceptance algorithm, acceptance probability scores for a set of products in a product class of the particular product to identify one or more available products;
identifying, by the computer, the substitute product for the particular product based on the product class of the particular product and a distance from each product storage location of the one more available products to an upcoming location along the path, wherein the computer identifies the substitute product by applying a weighted score to each available product of the one or more available products based on the acceptance probability score and the distance;

determining, by the computer, a revised path with the substitute product; and transmitting, by the computer to the autonomous vehicle, instructions for the revised path to include the product storage location for the available product.

2. The computer-implemented method of claim 1, further comprising:

generating, by the computer, the instructions for the path including a plurality of picking tasks, each of the picking tasks including a product identifier and the product storage location for the product to be collected; and presenting, by the computer for display on an interface, one or more tasks of the plurality of tasks in sequential order based on the instructions for the path.

3. The computer-implemented method of claim 1, further comprising receiving, by the computer from a client application executing on the computer, the notification indicating a status of the product, a product identifier, and a location of the autonomous vehicle along the path.

4. The computer-implemented method of claim 1, further comprising:

receiving, by the computer from a third party server, data indicative of an inventory; and determining, by the computer based on the data, the one or more available products based on the inventory.

5. The computer-implemented method of claim 1, wherein dynamically determining the revised path further comprises selecting the available product that minimizes a length of the revised path.

6. The computer-implemented method of claim 1, wherein dynamically determining the revised path further comprises adjusting, by the computer, the path to include the available product and the location as a task having a least distance from an unpicked product of the plurality of products along the path.

7. A system comprising:

at least one processor configured to:

transmit, to a autonomous vehicle, instructions corresponding to a path for the autonomous to collect a plurality of products stored at a plurality of corresponding product storage locations along the path;

in response to receiving a notification for a particular product of the plurality of products that the particular product is not at a corresponding product storage location where the particular product is stored, modify the path to include the product storage location of a substitute product for the particular product, the modifying including:

determining, using an acceptance algorithm, acceptance probability scores for a set of products in a product class of the particular product to identify one or more available products;

identifying the substitute product for the particular product based on the product class of the particular product and a distance from each product storage location of the one more available products to an upcoming location along the path, wherein the computer identifies the substitute product by applying a weighted score to each available product of the one or more available products based on the acceptance probability score and the distance;

determining a revised path with the substitute product; and transmitting, to the autonomous vehicle, instructions for the revised path to include the product storage location for the available product.

8. The system of claim 7, wherein the at least one processor is configured to:

generate the instructions for the path including a plurality of picking tasks, each of the picking tasks including a product identifier and the product storage location for the product to be collected; and present, for display on an interface, one or more tasks of the plurality of tasks in sequential order based on the instructions for the path.

9. The system of claim 7, wherein the at least one processor is configured to receive, from a client application executing on a computer, the notification indicating a status of the product, a product identifier, and a location of the autonomous vehicle along the path.

10. The system of claim 7, wherein the at least one processor is configured to determine, using an acceptance algorithm, acceptance probability scores for a set of products in a same product class to identify the one or more available products.

11. The system of claim 7, wherein the at least one processor is configured to select the available product that minimizes a length of the revised path.

12. The system of claim 7, wherein the at least one processor is configured to adjust the path to include the available product and the location as a task having a least distance from an unpicked product of the plurality of products along the path.

13. A non-transitory computer readable medium storing instructions when executed by one or more processors cause the one or more processors to:

transmit, to a autonomous vehicle, instructions corresponding to a path for the autonomous to collect a plurality of products stored at a plurality of corresponding product storage locations along the path;

in response to receiving a notification for a particular product of the plurality of products that the particular product is not at a corresponding product storage location where the particular product is stored, modify the path to include the product storage location of a substitute product for the particular product, the modifying including:

determining, using an acceptance algorithm, acceptance probability scores for a set of products in a product class of the particular product to identify one or more available products;

identifying the substitute product for the particular product based on the product class of the particular product and a distance from each product storage location of the one more available products to an upcoming location along the path, wherein the computer identifies the substitute product by applying a weighted score to each available product of the one or more available products based on the acceptance probability score and the distance;

determining a revised path with the substitute product; and transmitting, to the autonomous vehicle, instructions for the revised path to include the product storage location for the available product.

14. The non-transitory computer readable medium of claim 13, further comprising instructions when executed by the one or more processors further cause the one or more processors to:

generate the instructions for the path including a plurality of picking tasks, each of the picking tasks including a product identifier and the product storage location for the product to be collected; and present, for display on an interface, one or more tasks of the plurality of tasks in sequential order based on the instructions for the path.

\* \* \* \* \*